(12) United States Patent
Katzir et al.

(10) Patent No.: US 10,192,680 B2
(45) Date of Patent: Jan. 29, 2019

(54) PLANAR TRANSFORMER COMPONENTS COMPRISING ELECTROPHORETICALLY DEPOSITED COATING

(71) Applicant: PAYTON PLANAR MAGNETICS LTD., Ness-Ziona (IL)

(72) Inventors: Eli Katzir, Herzelia (IL); Yakov Koren, Ashkelon (IL); Amir Yativ, Gedera (IL); Peter Hope, Warwickshire (GB)

(73) Assignee: PAYTON PLANAR MAGNETICS LTD., Ness-Ziona (IL)

( * ) Notice: Subject to any disclaimer, the term of this patent is extended or adjusted under 35 U.S.C. 154(b) by 0 days.

(21) Appl. No.: 15/528,000

(22) PCT Filed: Nov. 3, 2016

(86) PCT No.: PCT/IL2016/051188
§ 371 (c)(1),
(2) Date: May 18, 2017

(87) PCT Pub. No.: WO2017/077536
PCT Pub. Date: May 11, 2017

(65) Prior Publication Data
US 2017/0338037 A1 Nov. 23, 2017

(30) Foreign Application Priority Data
Nov. 4, 2015 (IL) .......................................... 242459

(51) Int. Cl.
*H01F 27/28* (2006.01)
*H01F 41/04* (2006.01)
(Continued)

(52) U.S. Cl.
CPC ........... *H01F 41/042* (2013.01); *B32B 15/00* (2013.01); *B32B 15/20* (2013.01); *C08K 3/08* (2013.01);
(Continued)

(58) Field of Classification Search
CPC .... H01F 41/04; H01F 41/042; H01F 27/2804; H01F 27/25; H01F 27/06; H01F 27/2847;
(Continued)

(56) References Cited

U.S. PATENT DOCUMENTS

| 2,593,922 A | 4/1952 | Robinson et al. |
|---|---|---|
| 2,640,024 A | 5/1953 | Palmateer |

(Continued)

FOREIGN PATENT DOCUMENTS

| CN | 102360787 A | 2/2012 |
|---|---|---|
| EP | 0 517 400 A1 | 12/1992 |

(Continued)

OTHER PUBLICATIONS

Hope, (2009) Developing an electrophoretically depositable self-lubricating nanocomposite paint process for a short recoil semi-automatic handgun application. In Key Engineering Materials vol. 412: 157-163. Trans Tech Publications.

(Continued)

*Primary Examiner* — Mang Tin Bik Lian
(74) *Attorney, Agent, or Firm* — Vorys, Sater, Seymour & Pease LLP

(57) ABSTRACT

Provided is an electrically insulated component for use in a planar transformer. The insulated component may include a planar transformer conductive component having a first surface, a second surface and a plurality of edges. The insulated component may also include a first layer including an oxidized metal coating, as well as a second layer including an electrophoretically deposited (EPD) insulating coat-
(Continued)

ing. The EDP coating may include a polymer and an inorganic material. The first layer and the second layer may cover at least the first surface and the plurality of edges of the conductive component and the first layer may be disposed between the conductive component and the second layer. Also provided is a method of manufacturing of the electrically insulated component.

11 Claims, 13 Drawing Sheets

(51) Int. Cl.
| | |
|---|---|
| *B32B 15/00* | (2006.01) |
| *B32B 15/20* | (2006.01) |
| *C23C 22/34* | (2006.01) |
| *C23C 22/63* | (2006.01) |
| *C25D 11/02* | (2006.01) |
| *C25D 13/00* | (2006.01) |
| *C25F 1/00* | (2006.01) |
| *C08K 3/08* | (2006.01) |
| *C23C 22/10* | (2006.01) |
| *H01F 27/06* | (2006.01) |
| *H01F 27/25* | (2006.01) |
| *C25D 15/02* | (2006.01) |
| *H01F 5/00* | (2006.01) |
| *C25D 13/22* | (2006.01) |

(52) U.S. Cl.
CPC .............. *C23C 22/10* (2013.01); *C23C 22/34* (2013.01); *C23C 22/63* (2013.01); *C25D 11/02* (2013.01); *C25D 13/00* (2013.01); *C25D 15/02* (2013.01); *C25F 1/00* (2013.01); *H01F 27/06* (2013.01); *H01F 27/25* (2013.01); *H01F 27/2804* (2013.01); *C25D 13/22* (2013.01); *H01F 5/003* (2013.01); *H01F 2027/2819* (2013.01)

(58) Field of Classification Search
CPC ...... H01F 27/32; H01F 27/323; H01F 27/324; H01F 2027/2819; H01F 2027/2861; H01F 5/003; C25D 11/02; C08K 3/08; B32B 15/20; C23C 22/63; C23C 22/34; C23C 22/10

USPC ................................. 336/205, 206, 232, 209
See application file for complete search history.

(56) References Cited

U.S. PATENT DOCUMENTS

| | | | | |
|---|---|---|---|---|
| 3,365,688 | A * | 1/1968 | Saums | H01B 3/08 |
| | | | | 174/120 R |
| 3,892,646 | A | 7/1975 | Lazzarini et al. | |
| 4,400,676 | A * | 8/1983 | Mitsui | C08G 59/68 |
| | | | | 174/120 SR |
| 5,017,902 | A | 5/1991 | Yerman et al. | |
| 5,084,958 | A | 2/1992 | Yerman et al. | |
| 5,288,377 | A | 2/1994 | Johnson et al. | |
| 6,020,029 | A | 2/2000 | Ferrier et al. | |
| 6,031,279 | A | 2/2000 | Lenz | |
| 6,882,260 | B2 | 4/2005 | Katzir et al. | |
| 7,948,341 | B2 * | 5/2011 | Tellenbach | G01G 7/02 |
| | | | | 336/82 |
| 8,803,648 | B2 | 8/2014 | Lo et al. | |
| 2001/0042905 | A1 * | 11/2001 | Katzir | H01F 27/2804 |
| | | | | 257/666 |
| 2007/0045745 | A1 | 3/2007 | Ewe et al. | |
| 2007/0235810 | A1 | 10/2007 | Delgado et al. | |
| 2008/0038476 | A1 | 2/2008 | Cordani | |
| 2010/0108533 | A1 | 5/2010 | Fujii et al. | |
| 2011/0159296 | A1 | 6/2011 | Maenaka et al. | |
| 2014/0076613 | A1 | 3/2014 | Mahler et al. | |
| 2014/0084452 | A1 | 3/2014 | Nagamatsu et al. | |
| 2014/0192500 | A1 | 7/2014 | Yeong et al. | |
| 2015/0109088 | A1 * | 4/2015 | Kim | H01F 41/12 |
| | | | | 336/200 |

FOREIGN PATENT DOCUMENTS

| | | |
|---|---|---|
| GB | 482548 | 3/1938 |
| KR | 10-1123424 B1 | 3/2012 |
| WO | 2017/077536 A1 | 5/2017 |

OTHER PUBLICATIONS

Hope et al., (2015) Substrate selection and management strategies for aqueous EPD. Key Engineering Materials 654: 10-14.

* cited by examiner

PLANAR TRANSFORMER COMPONENTS COMPRISING ELECTROPHORETICALLY DEPOSITED COATING

FIELD OF THE INVENTION

The present invention is directed to electrically insulated conductive components of planar transformers, such as lead frames and printed circuit boards (PCBs) comprising electrophoretically deposited (EPD) coatings and to the methods of manufacturing of said insulated conductive components.

BACKGROUND OF THE INVENTION

A transformer is an electrical device that transfers electrical energy between two or more circuits through electromagnetic induction. Commonly, transformers are used to increase or decrease voltages of alternating current in electric power applications.

Highly efficient, yet compact, power conversion is fundamental to continued profitable growth of the electrical industries including telecommunications and data processing. The end-use devices in said technological fields generally require electrical energy in a form, which is different from what is supplied by the electric grid. For example, telecommunication devices require input voltage of 50 volt DC and computers require 5 volt DC or 3 volt DC. In order to adapt the input voltage of the device to the proper level, transformers can be incorporated in the device. Additionally, transformers must be incorporated into the electronic devices for safety reasons, to galvanically isolate the end equipment from the 230 or 117 volt and 50 or 60 Hz AC of the grid.

Transformer size is directly related to switching frequency determined by a switching transistor, wherein higher frequencies allow using smaller volume of the transformer and result in higher efficiency, if the right design is chosen. Accordingly, in the past, transformer size was dictated by the relatively low operating frequencies offered by the existing switching transistors. Following development of MOSFETs (Metal-Oxide Semiconductor Field-Effect Transistor) capable of converting power at frequencies well above 200 kHz, the major obstacles to ongoing performance improvements in power supplies are the limitations inherent in conventional "wire-wound-on-a-bobbin" transformers and companion inductors.

Transformers based on the planar principle eliminate virtually all the shortcomings of old-fashioned wire wound types. In a planar design, the windings are made of copper lead frames or printed circuit boards (flat copper spirals laminated into thin dielectric substrates). These windings are then sandwiched, along with appropriate insulators, between large area, yet thin, ferrite cores. Planar magnetics is probably the most cost effective solution for high frequency high power density power conversion equipment available today.

The principal advantage gained by the planar form is that a larger number of coils as a printed circuit and or lead frames can be fitted in to the equivalent space required by round-section wire. The planar printed coil opens up many design options, one of which is that the coil can be of any shape and width, and multiple coils on one face are possible. A wide conductor makes possible high current flow. Weight reduction is another benefit, this being of particular interest in aerospace applications. The planar circuits can be, and in most cases are interconnected with other circuits to generate a magnetic field and to meet a broad array of requirements.

One of the major hurdles of the planar transformer technology is the insulation of the copper lead frames or PCBs. The insulation of the conductive components of the planar transformers is typically performed by attaching an insulating polymeric film to the lead frame or using a soldering mask in case of the PCBs. Each lead frame or planar circuit usually needs to be insulated from the adjacent lead frame or circuit and almost always from the ferrite core passing through the planar coil. However, the terminals of the circuit need to be exposed so that electrical connections can be attached thereto. Thin Mylar®, Kapton® or high-temperature Nomex® films are generally used to cover the lead frames and provide the necessary interwinding insulation. Initially, the insulating films are cut into desired shape and then manually glued or hot pressed to the lead frame. Said procedure is prone to multiple problems, resulting from uneven shapes of the films, misaligned films from the opposite sides of the lead frame and as a result, insufficient insulation, or incomplete adhesion of the films. Being a non-automated process, application of the polymeric films to the lead frames requires trained manpower and large operation space, is time consuming and highly dependent on the alignment process precision. Additionally, relatively high thickness of the polymeric films, which can be handled by the workers, increases the overall thickness of the planar transformer. Furthermore, following the stacking of the isolated lead frames, the edges of the lead frames remain uncovered by the insulating material, which demands extra material for over-lapping and an additional step of the edge insulation is required.

For PCBs copper insulation comprising a liquid solidifying dielectric coating (e.g. solder mask) can be used. However, the thickness of the coating obtained shows significant variation, particularly in the vicinity of irregular copper shapes printed on the substrate, The coating can also become porous after drying, allowing an electrical discharge when the circuit is in use. In order to meet safety standards, such coatings require testing to conform to standards, and such testing increases production costs.

U.S. Pat. No. 6,882,260 to some of the inventors of the present invention is directed to a planar transformer circuit component comprising a flat lead frame coil or a first flat coil projecting from a first face of a printed circuit panel, said coil surrounding an aperture sized to allow projection therethrough of a ferrite core member, terminals for said coil being provided adjacent to an edge of said lead frame or panel, the exposed face and edges of said coil, including the edges of said aperture being insulated by a heat-resisting plastic film adhesively attached to said panel and to said coil face and to said coil edges, said film being provided with cut-outs leaving said terminals exposed for subsequent electrical connection.

One of the final steps of the preparation process of planar transformers' components includes cleaning of said parts in an aggressive cleaning solution, such as, for example, Vertrel® SFR, isopropyl alcohol (IPA) or Zestron® Co-150. Thus, a good adhesion between the insulating polymeric films and the conducting part is prerequisite for obtaining usable insulated conductive elements. Further, in order to meet the specific requirements of the planar transformers technology, the insulating layer of the conductive component should have an exceptionally high dielectric strength, such as at least about 1000 VAC per 1 Mil of an inch. Metal oxide coatings, which can be used, for example, as insulating films in element mounting boards of semiconductors, such as in US Patent Application No. 2014/0084452, are not suitable for insulating planar transformers' conductive elements, inter alia, due to the limitation of build-up thickness, metallurgical structure and cracking of the coating.

Electrophoretic deposition (EPD) is an electrochemical coating process, during which charged dispersed particles suspended in a liquid medium migrate under the influence of an electric field (electrophoresis) and are deposited onto an electrode. Any particles that can be used to form stable suspensions and that can carry a charge can be used in electrophoretic deposition. This includes materials such as polymers, pigments, dyes, ceramics and metals. There are several polymer types that have been used commercially for the EPD coatings, including epoxy and acrylic polymers.

The EPD process is useful for applying materials to any electrically conductive surface. Notable examples of industrial applications of EPD are formation of phosphors for cathode ray tubes and application of anti-corrosive primers for automotive body parts. Numerous advantages of the EPD process include uniform coating thickness, coating of complex fabricated objects, relatively high speed of coating, applicability to wide range of materials, easy control of the coating composition and suitability for automation.

US Patent Application No. 2014/0192500 is directed to a system, a packaged component and a method for making a packaged component, wherein the method comprises placing a component on a component carrier; encapsulating with an encapsulation body at least a portion of the component and the component carrier; and electrophoretic co-depositing organic molecules and inorganic elements thereby forming an insulating film on a conductive surface of the component, the component carrier or the encapsulation body.

There remains, however, an unmet need for an efficient, inexpensive, reproducible and easily automatable method for electrically insulating planar transformer conductive components, which would provide uniform coating encapsulating all the desired parts of the conductive component and being adequately adhered thereto.

SUMMARY OF THE INVENTION

The present invention provides an electrically insulated component for use in a planar transformer, comprising a planar transformer conductive component and an electrophoretically deposited (EPD) insulating coating. Further provided is a method of manufacturing of said electrically insulated component.

The present invention is based in part on the unexpected finding that an insulation coating can be applied to the conductive components of planar transformers by means of an electrophoretic deposition, instead of the customary process, which includes bonding or hot pressing polymeric films to said conductive components. Different coating techniques were evaluated by the inventors of the present invention, including brushing or spraying of film forming agents dispersed in a liquid medium onto the conductive components of the planar transformers, and dipping the conductive parts into the polymer-containing liquids. However, brushing, spraying and dipping techniques failed to provide an even insulating layer on the surface of the conductive component and, in particular, on the edges thereof. Only the electrophoretic deposition process afforded for the formation of a substantially uniform insulating coating on the surface and edges of the conductive components. In some embodiments, the thickness of the coating on the edges is essentially higher than on the surface of the conductive component, thereby ensuring the effective protection from electrical breakdown of the insulation layer in proximity to the edges of the conductive component, which are particularly prone to electrical breakdown.

It has been unexpectedly discovered by the inventors of the present invention that in order to impart mechanical and/or chemical stability to the EPD coating applied to the conductive component of the planar transistor, and in particular following the final cleaning step, an intervening layer should be formed between the conductive component and the EPD coating. Inventors have therefore developed a process for the formation of an oxidized metal coating on the conductive component of the planar transformer, which is prerequisite for the adhesion of the electrophoretically deposited insulating coating to the conductive component. Furthermore, the effect of thickness of said adhesion-facilitating intervening layer and the formation process thereof on the stability of the EPD coating was assessed in order to further improve the adhesion between the insulating coating and the conductive component of the planar transformer.

Thus, according to a first aspect, the present invention provides an electrically insulated component suitable for use in a planar transformer, the insulated component comprising a planar transformer conductive component having two opposed surfaces comprising a first surface and a second surface and a plurality of edges; and two distinct coating layers comprising a first layer and a second layer; the first layer being disposed between the conductive component and the second layer; wherein the first layer and the second layer cover at least the first surface and the plurality of edges of the conductive component; wherein the first layer comprises an oxidized metal coating and the second layer comprises an electrophoretically deposited (EPD) insulating coating, comprising a polymer and an inorganic material. In some embodiments, the first layer facilitates adhesion of the second layer to the conductive component.

In some embodiments, the first surface and the plurality of edges on the conductive component are completely covered by the first layer.

In some embodiments, the first layer and the second layer are chemically distinct. In some embodiments, the first layer and the second layer are structurally distinct. The thickness of the first layer can range from about 0.1 µm to about 5 µm. In some embodiments, the thickness of the first layer ranges from about 1 µm to about 5 µm. In further embodiments, the thickness of the first layer ranges from about 1.5 µm to about 2.5 µm. In some embodiments, the thickness of the first layer ranges from about 0.1 µm to about 1 µm. In further embodiments, the thickness of the first layer ranges from about 0.2 µm to about 0.8 µm. In some embodiments, the oxidized metal coating comprises the same metal as the conductive component.

According to some embodiments, the conductive component is made of copper. According to further embodiments, the oxidized metal coating is selected from the group consisting of cuprous oxide, cupric oxide and a combination thereof. Each possibility represents a separate embodiment of the invention. In particular embodiments, the oxidized metal coating consists essentially of cuprous oxide, cupric oxide or a combination thereof. In some embodiments, the thickness of the coating ranges from about 1 µm to about 5 µm. According to some embodiments, the conductive component is made of aluminum.

According to further embodiments, the oxidized metal coating is selected from the group consisting of aluminum oxide, titanium oxide, zirconium oxide, manganese oxide and combinations thereof. Each possibility represents a separate embodiment of the invention. In particular embodiments, the oxidized metal coating consists essentially of aluminum oxide, titanium oxide, zirconium oxide, manganese oxide or combinations thereof. In further embodiments, the oxidized metal coating consists essentially of aluminum oxide. In some embodiments, the thickness of the coating ranges from about 0.2 µm to about 0.8 µm.

In some embodiments, the insulating EPD coating is a conformal coating. The thickness of the second layer can range from about 15 µm to about 40 µm. According to some embodiments, the thickness of the second layer on the plurality of edges is higher than on the first surface by at least about 10%. In some embodiments, the second layer has a dielectric strength of at least about 40 KV/mm According to some embodiments, the polymer is selected from the group consisting of polyurethane, acrylic polymer, epoxy, polyester, aminoplast, polybutadiene, and combinations thereof. Each possibility represents a separate embodiment of the invention. In certain embodiments, the polymer is a polyurethane. According to further embodiments, the polyurethane comprises units selected from the group consisting of acrylate units, methacrylate units, isocyanate units, and combinations thereof. The polymer can be cationically or anionically modified. Each possibility represents a separate embodiment of the invention. In certain embodiments, the acrylate units and the methacrylate units are cationically modified.

The inorganic material can be selected from the group consisting of alumina ($Al_2O_3$), aluminate, silica ($SiO_2$), silicates, Mica, cerium oxide ($Ce_2O_3$), cerium dioxide ($CeO_2$), yttrium oxide ($Y_2O_3$), boron nitride, and combinations thereof. Each possibility represents a separate embodiment of the invention. In certain embodiments, the inorganic material is alumina. In further embodiments, alumina is nanosized.

According to some embodiments, the planar transformer conductive component is selected from a flat lead frame coil or a flat coil projecting from a printed circuit panel. Each possibility represents a separate embodiment of the invention. In further embodiments, the coil has an aperture sized to allow projection therethrough of a ferrite core. In certain embodiments, the planar transformer conductive component is a flat lead frame coil. In further embodiments, the first layer and the second layer cover the second surface of the conductive component.

In certain embodiments, the planar transformer conductive component is a flat coil projecting from a printed circuit panel. In further embodiments, the planar transformer conductive component comprises a plurality of flat coil projecting from the printed circuit panel. The printed circuit panel can include up to about 500 flat coils projecting therefrom. In some embodiments, the planar transformer conductive component comprises a plurality of flat coil projecting from two opposite surfaces of the printed circuit panel. According to some embodiments, the planar transformer conductive component further comprises at least two terminals. In further embodiments, the at least two terminals are not covered by the first and the second layers.

According to some embodiments, the invention further provides a planar transformer, comprising a plurality of insulated components according to the principles of the present invention and a ferrite core.

In some embodiments, the planar transformer comprises a plurality of flat lead frame coils. In further embodiments, the plurality of flat lead frame coils are stacked in a pillar, connected along the second layers of the adjacent insulated lead frame coils In some embodiments, the planar transformer comprises a plurality of flat coils projecting from the printed circuit panel. In further embodiments, the plurality of insulated components are stacked in a pillar, connected along the second layer and the printed circuit panel of adjacent insulated components. In other embodiments, the plurality of insulated components are stacked in a pillar, connected along the second layers of the adjacent insulated components.

In another aspect there is provided a method of manufacturing an electrically insulated component for use in a planar transformer, the method comprising providing a planar transformer conductive component having a first surface, a second surface and a plurality of edges; forming a first layer on at least the first surface and the plurality of edges of the conductive component by exposing the conductive component to an oxidizing solution or a conversion coating solution; and forming a second layer on the first layer by an electrophoretic deposition (EPD) process from a liquid dispersion comprising a film-forming agent and a rheology agent.

In yet another aspect there is provided a method of manufacturing an electrically insulated component for use in a planar transformer, the method comprising providing a planar transformer conductive component having a first surface, a second surface and a plurality of edges; forming a first layer on at least the first surface and the plurality of edges of the conductive component by exposing the conductive component to an electrical oxidation process; and forming a second layer on the first layer by an electrophoretic deposition (EPD) process from a liquid dispersion comprising a film-forming agent and a rheology agent.

In some embodiments, the oxidizing solution comprises an alkali metal chlorite.

In some embodiments, the step of forming a first layer comprises dipping the conductive component in the oxidizing solution. In further embodiments, the step of forming a first layer comprises dipping the conductive component in the oxidizing solution for about 1 to about 5 minutes. In some embodiments, the oxidizing solution temperature is from about 60° C. to about 80° C.

In some embodiments, the oxidizing solution further comprises an alkali metal hydroxide. The alkali metal can be selected from sodium or potassium. In some exemplary embodiments, the alkali metal chlorite comprises sodium chlorite. In further exemplary embodiments, the alkali metal hydroxide comprises sodium hydroxide. In some exemplary embodiments, the oxidizing solution comprises sodium chlorite and sodium hydroxide. In some embodiments, the oxidizing solution comprises from about 20% (w/w) to about 30% (w/w) sodium chlorite. In further embodiments, the oxidizing solution comprises from about 15% (w/w) to about 25% (w/w) sodium hydroxide. The oxidizing solution can further include trisodium phosphate. The concentration of trisodium phosphate in the oxidizing solution can range from about 2% (w/w) to about 5% (w/w).

In some embodiments, the first layer comprises an oxidized metal coating. In certain embodiments, the oxidized metal coating is selected from cuprous oxide, cupric oxide or a combination thereof. In further embodiments, the conductive component is made of copper. In some embodiments, the step of forming a first layer comprises dipping the conductive component in the conversion coating solution. In further embodiments, the step of forming a first layer comprises dipping the conductive component in the conversion coating solution for about 30 seconds to about 3 minutes. In some embodiments, the conversion coating solution temperature is from about 18° C. to about 30° C. In some embodiments, the conversion coating solution comprises at least one transition metal salt or acid selected from hexafluorotitanic acid, zirconium salt and manganese salt. Each possibility represents a separate embodiment of the invention. In certain embodiments, the concentration of said salt or acid is below about 10% (w/w). In some embodiments, the conversion coating solution comprises hexafluorotitanic acid, zirconium salt and manganese salt. In certain embodiments, the conversion coating solution is a non-chromate coating.

In some embodiments, the liquid dispersion is an aqueous-based dispersion. In further embodiments, the liquid dispersion is an aqueous colloidal dispersion. The film-forming agent can be selected from a polymer, pre-polymer, oligomer, monomer or combinations thereof. Each possibility represents a separate embodiment of the invention. The polymer can be a thermosetting polymer. In some embodiments, the polymer is curable by radiation. In some embodiments, the film-forming agent is selected from the group consisting of an acrylic polymer, isocyanate, polyisocyanate, polyol, an epoxy resin, polyester, aminoplast, polybutadiene, and combinations thereof. The film-forming agent can be positively or negatively charged. In some embodiments, the film-forming agent is positively charged. In certain embodiments, the liquid dispersion comprises a cationically modified acrylic polyol and a blocked polyisocyanate.

The rheology agent can be selected from the group consisting of alumina, aluminate, silica, silicate, and combinations thereof. Each possibility represents a separate embodiment of the invention. In certain embodiments, the rheology agent is present in the liquid dispersion in a colloidal form.

The EPD process can be performed at a temperature range of from about 16° C. to about 35° C. The EPD process can be performed at a voltage bias of from about 40V to about 120V. In some embodiments, duration of the EPD process is from about 45 sec to about 120 sec. In certain embodiments, the EPD process is performed in a bath comprising an ultrafiltration system.

In some embodiments, the step of forming a second layer further comprises drying the planar transformer conductive component at a temperature of from about 80° C. to about 90° C. for about 15 minutes. In further embodiments, the step comprises curing the second layer at a temperature of from about 150° C. to about 170° C. In some embodiments, the curing is performed for at least about 30 minutes. In other embodiments, the step includes curing the second layer by exposing to a radiation source. The radiation source can be selected from ultra-violet (UV) light source, visible light source and electron beam. Each possibility represents a separate embodiment of the invention.

In some embodiments, the second layer comprises an electrophoretically deposited (EPD) insulating coating, comprising a polymer and an inorganic material.

According to some embodiments, the method comprises a pretreatment step comprising exposing the planar transformer conductive component to a cleaning solution. In some embodiments, said cleaning solution is an alkaline electrolytic solution. In certain embodiments, the electrolytic cleaning solution comprises an alkaline salt selected from the group consisting of an alkali metal carbonate, alkali metal hydroxide, and combinations thereof. Each possibility represents a separate embodiment of the invention. In some embodiments, the electrolytic cleaning solution comprises potassium carbonate and potassium hydroxide. In further embodiments, the electrolytic cleaning solution comprises from about 0.5% (w/w) to about 10% (w/w) potassium carbonate and from about 1.0% (w/w) to about 2.5% (w/w) potassium hydroxide. The electrolytic cleaning solution can further include disodium metasilicate. The weight percent of disodium meta-silicate in the electrolytic cleaning solution can range from about 2.5% to about 5%, In some embodiments, said cleaning solution is an acidic solution. The acidic cleaning solution can include sulfuric acid, hydrofluoric acid, nitric acid or any combination thereof. Each possibility represents a separate embodiment of the invention. In some embodiments, the acidic cleaning solution further comprises hydrogen peroxide. In some exemplary embodiments, the acidic cleaning solution comprises sulfuric acid, hydrofluoric acid, nitric acid and hydrogen peroxide. The total concentration of the acids can range from about 3% (w/w) to about 30% (w/w). The temperature of the acidic cleaning solution can be from 18 to 30 □.

In some embodiments, the step of exposing the planar transformer conductive component to the cleaning solution comprises dipping of the conductive component into the cleaning solution. In some embodiments, the conductive component is dipped in the cleaning solution for about 1 to about 5 minutes. In certain embodiments, the conductive component is dipped in the alkaline electrolytic cleaning solution for about 1 to about 3 minutes. In certain embodiments, the conductive component is dipped in the acidic cleaning solution for about 2 to about 4 minutes. According to some embodiments, the pretreatment step further comprises exposing the planar transformer conductive component to an etching solution. In some embodiments, the etching solution comprises a sulfate-based salt. The sulfate-based salt can be selected from an alkali metal sulfate, alkali metal persulfate or combinations thereof. Each possibility represents a separate embodiment of the invention. In some embodiments, the etching solution comprises sodium hydrogen sulfate and sodium persulfate. The weight percent of each one of sodium hydrogen sulfate and sodium persulfate in the electrolytic cleaning solution can range from about 3% to about 6%. Each possibility represents a separate embodiment of the invention.

In some embodiments, the step of exposing the planar transformer conductive component to an etching solution comprises dipping of the conductive component into the etching solution. In some embodiments, the conductive component is dipped in the etching solution for about 1 to about 3 minutes.

According to some embodiments, the pretreatment step comprises exposing the planar transformer conductive component to a degreasing solution. In certain embodiments, the degreasing solution comprises borate tetra sodium salt. The temperature of the degreasing solution can range from about 50□ to about 100□.

In some embodiments, the step of exposing the planar transformer conductive component to the degreasing solution comprises dipping of the conductive component into the degreasing solution. In some embodiments, the conductive component is dipped in the degreasing solution for about 7 to about 10 minutes.

In some embodiments, the method comprises rinsing the planar transformer conductive component between each method step. In some embodiments, the planar transformer conductive component is exposed to the liquid dispersion solution without a prior drying step.

In some embodiments, the method comprises a final cleaning step comprising exposing the planar transformer conductive component comprising the first layer and the second layer to a solution comprising an organic solvent. In some embodiments, the solution is applied by dipping of the conductive component in said solution.

In some embodiments, the planar transformer conductive component comprises at least two terminals. In certain such embodiments, the at least two terminals are not exposed to the oxidizing solution, liquid dispersion, cleaning solution, etching solution, degreasing solution or any combination thereof. For example, the at least two terminals can be covered by a mask during the step of forming a first layer, step of forming a second layer, pretreatment step or any combination thereof. Each possibility represents a separate embodiment of the invention.

According to some embodiments, the planar transformer conductive component is selected from a flat lead frame coil or a flat coil projecting from a printed circuit panel. Each possibility represents a separate embodiment of the invention. According to certain embodiments, the conductive component is made of copper. In other embodiments, the conductive component is made of aluminum.

In some embodiments, the planar transformer conductive component is a flat lead frame coil. In some embodiments, the step of providing the planar transformer conductive component comprises rounding off the plurality of edges of the lead frame coil. In some embodiments, the method comprises forming the first layer on the second surface of the conductive component.

In some embodiments, the planar transformer conductive component is a flat coil projecting from a printed circuit panel. In further embodiments, the planar transformer conductive component comprises a plurality of flat coils projecting from the printed circuit panel. In certain such embodiments, the at least two terminals of the plurality of flat coils are electrically connected during the EPD process.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
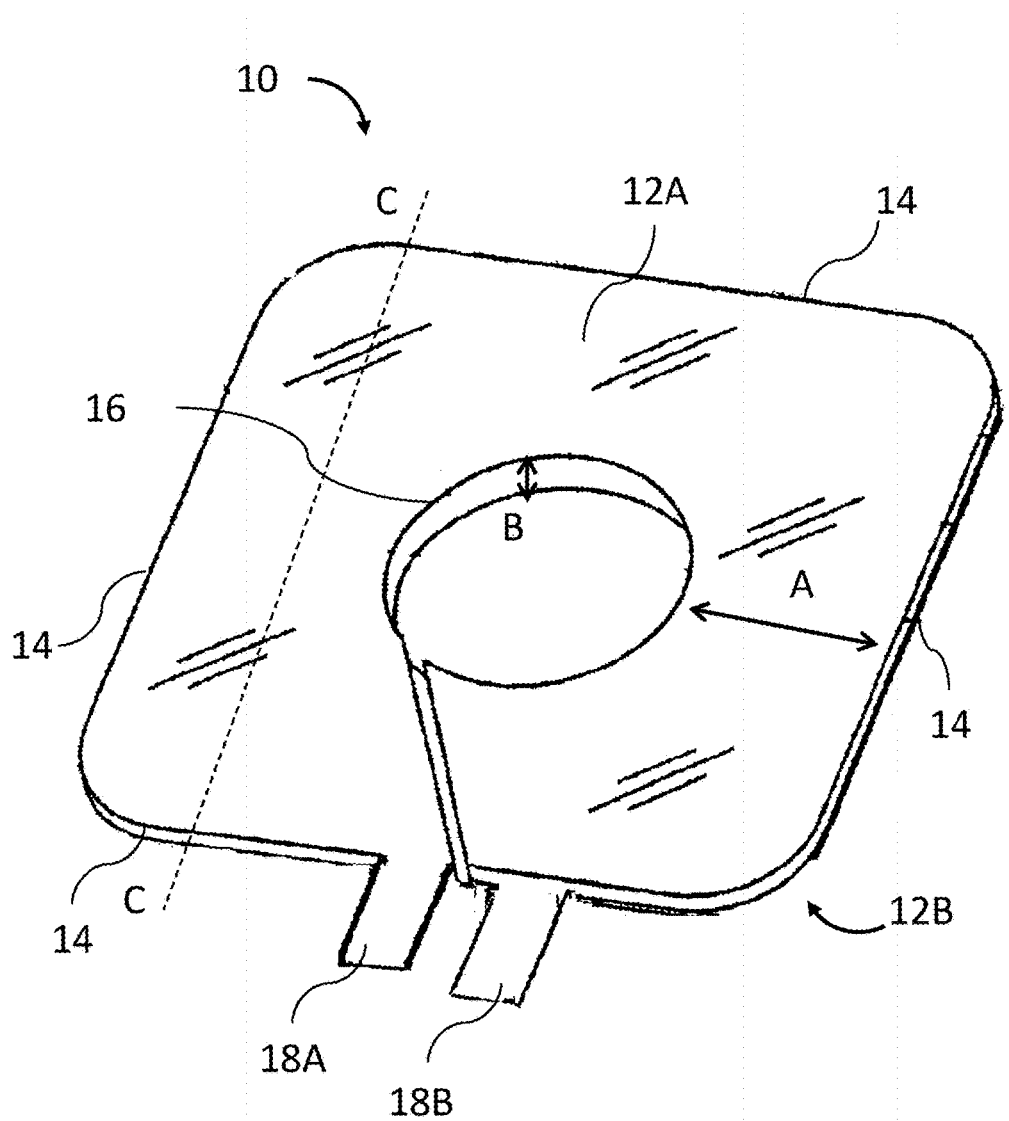
FIG. 1: Schematic representation of the flat lead frame coil, according to some embodiments of the present invention.

The present invention provides an electrically insulated component for use in a planar transformer, comprising a planar transformer conductive component and an electrophoretically deposited (EPD) insulating coating. Further provided is a method of manufacturing of said electrically insulated component.

The present invention offers a long sought-after alternative to the conventional insulation of conductive components of planar transformers. While the typical process of conductive component insulation includes application of polymeric films to said component by means of manual gluing or hot pressing, the present invention provides an insulation process, which can be easily automated and can therefore be advantageously used in mass-production, while reducing the required man-power and human error factor and significantly increasing effectiveness of the process. Furthermore, the method of the present invention improves the insulation quality, thereby providing planar transformer conductive components having an electrical insulation, offering enhanced protection against electrical breakdown.

Inventors of the present invention have developed various coating processes in order to effectively substitute the conventional insulation method. The developed processes included brushing or spraying film forming polymeric agents dispersed in a liquid medium onto the conductive components of the planar transformers, dipping the conductive components into said polymer-containing liquids and electrophoretically depositing said polymeric film-forming agents on the conductive components. The inventors unexpectedly discovered that brushing, spraying and dipping techniques failed to provide an even insulating layer on the conductive component, such that the edges thereof remained essentially uncovered by the insulating coating. In contrast, the electrophoretic deposition coating process afforded for the formation of a conformal insulating coating on the surface and edges of the conductive components. In some embodiments, the thickness of the coating on the edges is essentially higher than on the surface, thereby ensuring the effective protection from electrical breakdown of the insulation layer in proximity to the edges of the conductive component.

In a typical production process of planar transformers, a final cleaning step is required in order to remove any contaminants, including fluxes or the residual and undesired constituents of the various solutions and dispersions applied to the conductive component. It has been unexpectedly discovered by the inventors of the present invention, that in order to impart mechanical, chemical and/or long-term stability to the EPD coating applied to the conductive component of the planar transistor, an adhesion-facilitating layer should be formed between the conductive component and the EPD coating. For example, the EPD coating applied to the conductive component without previously forming the first layer thereon, was not stable in the final cleaning step. Accordingly, the method of manufacturing of the electrically insulated component includes a prerequisite step of forming an intervening layer, including exposing the conductive component to an oxidizing solution or to an electrical oxidation. The electrically insulated planar transistor components according to the principles of the present invention include an oxidized metal layer between the EPD insulating coating and the conductive component. The composition of the oxidizing solution, oxidized metal coating formation conditions and the thickness of the obtained coating had a prominent effect on the adhesion of the insulating EPD coating and the stability thereof in the final cleaning step.

Thus, according to a first aspect, the present invention provides an electrically insulated component suitable for use in a planar transformer, the insulated component comprising a planar transformer conductive component having two opposed surfaces comprising a first surface and a second surface and a plurality of edges; and two distinct coating layers comprising a first layer and a second layer; the first layer being disposed between the conductive component and the second layer; wherein the first layer and the second layer cover at least the first surface and the plurality of edges of the conductive component; wherein the first layer comprises an oxidized metal coating and the second layer comprises an electrophoretically deposited (EPD) insulating coating, comprising a polymer and an inorganic material.

The term "insulating coating", as used herein, refers to a coating having an electrical insulating property measured as dielectric strength. In some embodiments, the term "insulating coating" refers to a coating having a thermal insulation property at least in part, that is to say being less resistant to heat dissipation or transfer from the conductive component.

Planar Transformer Conductive Component

The term "conductive component", as used herein, refers to a coil (also termed herein a "winding"), made of a conductive material, which is configured to conduct electric current and to produce magnetic flux in response to said electric current. The coil can include one or more planar loops. The coil has a starting point and an end point.

A person skilled in the art will readily appreciate that the coil can be made in any shape or form, as long as it includes an aperture suitable for the projection there through of a ferrite core. The non-limiting examples of suitable forms of coils include circular, circular-like, oval, spiral, triangular, square and rectangular forms. Regardless of the shape, the coil having one or more planar loops has two opposed surfaces, including a top surface and a bottom surface, wherein the top surface includes top surfaces of the planar loops and the bottom surface includes bottom surfaces of the loops. The coil further includes a plurality of edges, disposed between the top and the bottom surface on the inner and outer perimeters of the planar loops.

The coil can be defined by width, thickness, number of loops and/or distance between proximate loops. The width and/or thickness of the loop and the distance between the proximate loops can be substantially uniform along the length of the coil. Alternatively, the width of the loop and/or the distance between the proximate loops can vary along the length of the coil, depending on the form thereof. The width of the loop can range from about 0.1 mm to about 100 mm The distance between the proximate loops can range from about 0.1 mm to about 10 mm.

The conductive component according the principles of the present invention has two opposing surfaces including a first surface and a second surface. In some embodiments, the first surface of the conductive component includes the top surface of the coil. In some embodiments, the second surface of the conductive component includes the bottom surface of the coil.

According to some embodiments, the aperture suitable for the projection of a ferrite core propagates through the first and/or the second surface of the conductive component.

The conductive component further includes a plurality of edges. In some embodiments, the plurality of edges of the conductive component comprises the plurality of edges of the coil. In some embodiments, the plurality of edges are disposed between the top and the bottom surface on the inner and outer perimeters of the conductive component. The plurality of edges can include two or more edges. For example, the plurality of edges can include the inner edge adjacent to the aperture and the outer edge of the conductive component. Accordingly, in embodiments, where the shape of the coil and of the aperture is circular or circular-like, the plurality of the edges includes two edges. In the embodiments, where the shape of the coil is rectangular or square and of the aperture is circular, the plurality of edges can include five edges. In certain embodiments, the plurality of edges includes 2, 3, 4, 5, 6, 7, 8, 9, 10 or more edges. Each possibility represents a separate embodiment of the invention.

Dimensions of the conductive component of the planar transformer can vary significantly, according to the desired field of use. Surface area of the conductive component of the planar transformer can range from about 0.1 $cm^2$ to about 500 $cm^2$. In further embodiments, the surface area of the conductive component ranges from about 1 $cm^2$ to about 500 $cm^2$, from about 3 $cm^2$ to about 300 $cm^2$, from about 1 $cm^2$ to about 100 $cm^2$, from about 1 $cm^2$ to about 3 $cm^2$, from about 3 $cm^2$ to about 10 $cm^2$, from about 10 $cm^2$ to about 50 $cm^2$, from about 50 $cm^2$ to about 100 $cm^2$, from about 100 $cm^2$ to about 200 $cm^2$, from about 200 $cm^2$ to about 300 $cm^2$, or from about 300 $cm^2$ to about 500 $cm^2$. Each possibility represents a separate embodiment of the invention. The term "surface area of the conductive component", as used herein, refers to the total surface of the first surface and of the second surface thereof. Thickness of the conductive component of the planar transformer can range from about 15 μm to about 5 mm. In certain embodiments, the thickness of the conductive component is from about 1 μm to about 1 mm. The term "thickness of the conductive component", as used herein, refers to the distance between the first surface and the second surface of the conductive component. Regardless of the shape and type of the conductive component, the ratio between the surface area and the thickness thereof generally ranges from about 1 to 5 up to about 1 to 1000. The relatively complex geometry of some conductive components and the immense difference between the surface are and thickness thereof impose a significant challenge for effectively covering the whole body of the conductive component by an insulating layer.

Furthermore, according to some embodiments, the plurality of edges of the conductive component has a substantially pointed shape. Said shape of the edges makes the desired conformal coating even more difficult. In some exemplary embodiments, the method of the present invention includes rounding off the edges of the conductive component. The edges can be rounded by a procedure selected from mechanical rubbing, stone or other media vibrating, chemical etching, and electro-polishing. Each possibility represents a separate embodiment of the invention. Without wishing to being bound by theory or mechanism of action, it is assumed that rounding off the edges improves the adhesion of the EPD coating layer to the conductive component edges and decreases the thickness distribution of said layer on the edges. According to some embodiments, the plurality of edges of the conductive component in the final insulated form has a substantially rounded shape. The term "rounded shape", as used herein, refers in some embodiments, to a shape of a half circle.

The conductive component can be made of any material having sufficient conductivity. The non-limiting examples of said materials include copper and aluminum. Each possibility represents a separate embodiment of the invention. According to some exemplary embodiments, the conductive component is made of copper. According to some exemplary embodiments, the conductive component is made of aluminum.

The conductive component can have at least two terminals. The terminals provide electric connection of the conductive component to the voltage source and to other conductive components in the planar transformer. In some embodiments, said terminals comprise the starting point and the end point of the coil. In other embodiments, the terminals are connected to the starting point and the end point of the coil. The terminals can be made of any conductive material, such as, but not limited to, copper, aluminum, silver or gold.

The planar transformer conductive component according to the principles of the present invention can be selected from a flat lead frame coil or a flat coil projecting from a printed circuit panel. Each possibility represents a separate embodiment of the invention.

In some embodiments, the planar transformer conductive component is a flat lead frame coil. The surface area of the flat lead frame coil can range from about 1 $cm^2$ to about 500 $cm^2$. The thickness can range from about 15 μm to about 5 mm.

FIG. 1 schematically represents flat lead frame coil 10, according to some embodiments of the present invention. Lead frame coil 10 includes two opposed surfaces including first surface 12A, second surface 12B, a plurality of edges 14 and aperture 16 suitable for the projection therethrough of a ferrite core (not shown). Lead frame coil 10 further includes terminals 18A and 18B, connected to the start point and the end point of the coil.

Thickness of lead frame coil 10 is defined by segment B, which is the distance between first surface 12A and second surface 12B. Width of lead frame coil 10 is defined by segment A, which is the distance between edge 14 and aperture 16.

In some embodiments, the planar transformer conductive component is a flat coil projecting from a printed circuit panel. The surface area of the flat coil projecting from a printed circuit panel can range from about 0.1 $cm^2$ to about 100 $cm^2$. The thickness can range from about 15 μm to about 5 mm. The printed circuit panel can be made of any rigid electrically insulating material, as known in the art.

Figure 2A:
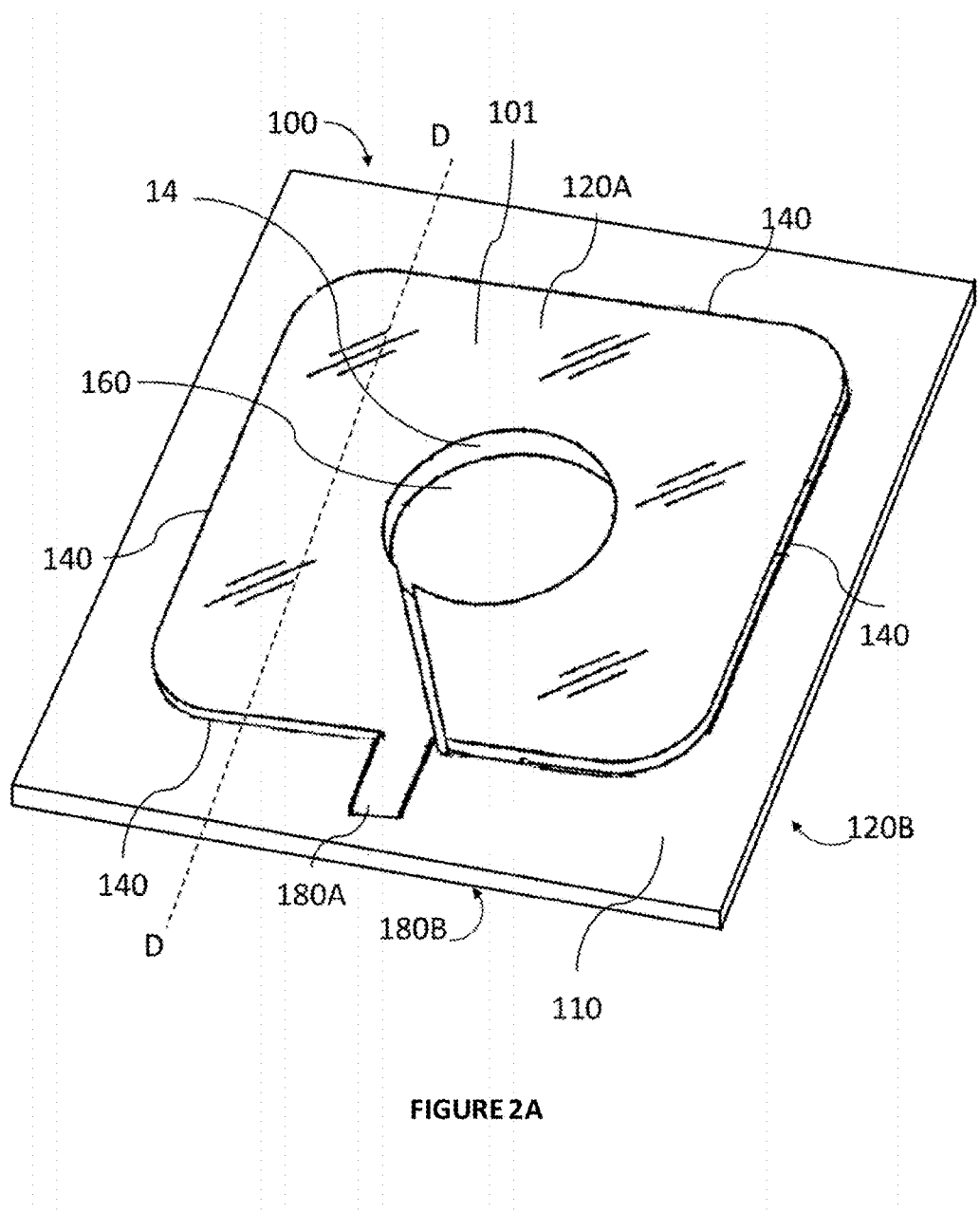
FIG. 2A: Schematic representation of the flat coil projecting from a printed circuit panel, according to some embodiments of the present invention.

FIG. 2A schematically represents flat coil projecting from a printed circuit panel 100, according to some embodiments of the present invention. Flat coil projecting from a printed circuit panel 100 includes flat coil 101 disposed on printed circuit panel 110 and projecting therefrom. Flat coil 101 has two opposed surfaces including first surface 120A, second surface 120B, adjacent to printed circuit panel 110, a plurality of edges 14 and aperture 16 suitable for the projection therethrough of a ferrite core (not shown). Flat coil 101 further includes terminals 180A (on one side of printed circuit panel 110) and 180B (on another side of printed circuit panel 110), connected to the start point and the end point of the coil.

In some embodiments, the planar transformer conductive component comprises a plurality of flat coils projecting from a printed circuit panel. In some embodiments, the planar transformer comprises a plurality of flat coils projecting from the printed circuit panel. In certain such embodiments, one printed circuit panel can include up to about 500 coils, projecting from said panel, up to about 400 coils, or up to about 300 coils. Each possibility represents separate embodiment of the invention. In some embodiments, the print circuit panel comprises at least about 50 coils projecting from said panel, at least about 100 coils or at least about 200 coils. Each possibility represents separate embodiment of the invention.

The printed circuit panel can be double-sided (i.e. including flat coils on the two surfaces thereof).

Figure 2B:
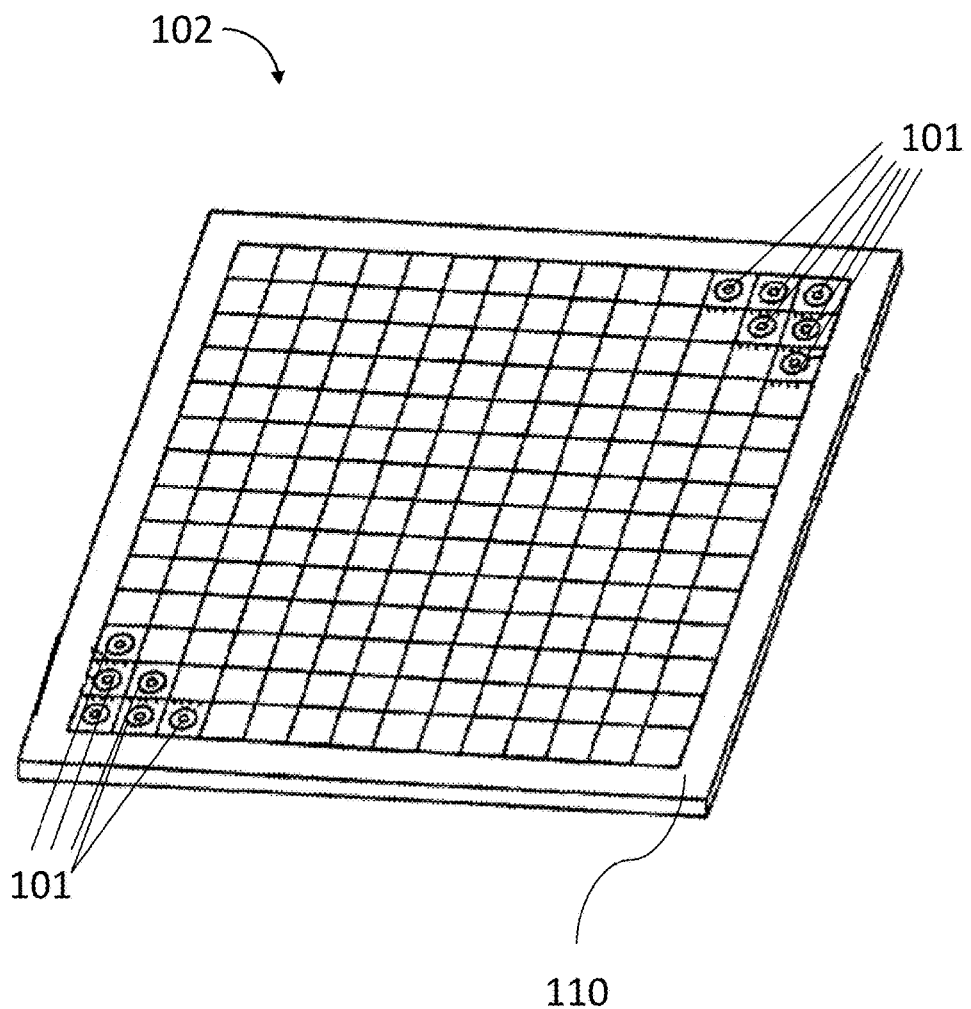
FIG. 2B: Schematic representation of the plurality of the flat coils projecting from a printed circuit panel, according to some embodiments of the present invention.

FIG. 2B schematically represents planar transformer component 102 including a plurality of flat coils 101 projecting from printed circuit panel 110, according to some embodiments of the present invention.

First Layer Comprising an Oxidized Metal Coating

The first layer comprising an oxidized metal coating is disposed between the conductive components and the second layer, comprising an EPD insulating coating. Without wishing to being bound by theory or mechanism of action, the oxidized metal coating affords for the adequate adhesion between the EPD insulating coating and the first surface, and optionally, second surface, and the edges of the conductive component.

The term "adequate adhesion", as used in some embodiments, refers to the type of adhesion, where the insulating coating remains on the surface of the conductive component following an adhesion test. In further embodiments, the term "adequate adhesion" refers to the type of adhesion, where at least about 95% of the insulating coating remains on the surface of the conductive component following an adhesion test, at least about 90%, at least about 85%, at least about 80%, at least about 75% or at least about 70%. Each possibility represents a separate embodiment of the invention. The adhesion test can be selected from a knife test, a tape test, a pull-off test or a scrape test or other adhesion tests as known in the art.

Knife Test is a simple test that requires the use of a utility knife to pick at the coating. Using the knife and cutting guide, two cuts are made into the coating with a 30-45 degree angle between legs and down to the substrate which intersects to form an "X". At the vertex, the point of the knife is used to attempt to lift up the coating from the substrate or from the coating below. A standard method for the application and performance of this test is available in ASTM D6677.

Tape Test can be performed on metal substrates. Pressure sensitive tape is applied and removed over cuts made in the coating. There are two variants of this test; the X-cut tape test and the cross hatch tape test. In the X-cut tape test two cuts are made into the coating with a 30-45 degree angle between legs and down to the substrate which intersects to form an "X". The cuts are made by using a sharp razor blade, scalpel, knife or other cutting device. A steel or other hard metal straightedge is used to ensure straight cuts. Tape is placed on the center of the intersection of the cuts and then removed rapidly. The X-cut area is then inspected for removal of coating from the substrate or previous coating and rated. The cross hatch tape test uses a cross-hatch pattern rather than the X pattern. A cutting guide or a special cross-hatch cutter with multiple preset blades is needed to make sure the incisions are properly spaced and parallel. After the tape has been applied and pulled off, the cut area is then inspected and rated. A standard method for the application and performance of these tests is available in ASTM D3359. In some embodiments, the term "adequate adhesion" refers to the type of adhesion, where no traces of coating can be seen on the tape.

Pull-Off Test includes affixing a loading fixture (also termed "dolly") to a coating by an adhesive. By use of a portable pull-off adhesion tester, a load is increasingly applied to the surface until the dolly is pulled off. The force required to pull the dolly off or the force the dolly withstood, yields the tensile strength in pounds per square inch (psi) or mega Pascals (MPa). A standard method for the application and performance of this test is available in ASTM D4541 and ISO 4624.

In the Scrape Test adhesion is determined by pushing the coated panels beneath a rounded stylus or loop that is loaded in increasing amounts until the coating is removed from the substrate surface. A device called a balanced-beam scrape-adhesion tester is used. A standard method for the application and performance of this test is available in ASTM D2197.

Additional adhesion tests are described in ASTM D2370, ASTM D5179, ASTM D4145, and ASTM 4146. Adhesion is also a measurable result of some hardness tests made by pencil hardness, gravelometer, impact (falling dart, etc.) or mandrel bend. Coating chip-off should be recorded during these tests. Finally, loss of adhesion can be noted during some chemical resistance tests where the coating blisters, bubbles up or even falls off.

Without wishing to being bound by theory or mechanism of action, it is contemplated that the composition and/or thickness of the oxidized metal coating and the coating formation conditions affect the adhesion of the second layer to the conductive component.

The term "oxidized metal", as used in some embodiments, refers to a metal oxide, a metal hydroxide or a combination thereof. Each possibility represents a separate embodiment of the invention. In some embodiments, the oxidized metal coating can further include additional forms of oxidized metal, such as, but not limited to, metal chlorite, metal phosphate or metal sulfate. Each possibility represents a separate embodiment of the invention.

In some embodiments, the oxidized metal comprises an oxidized transition metal. The oxidized metal can include a metal selected from copper, aluminum, titanium, zirconium, manganese and combinations thereof. In certain such embodiments, the metal is present in its oxidized form. Each possibility represents a separate embodiment of the invention.

According to some embodiments, the oxidized metal coating is selected from cuprous oxide, cupric oxide, aluminum oxide, titanium oxide, zirconium oxide, manganese oxide and combinations thereof. According to some embodiments, the oxidized metal coating is selected from cuprous oxide, cupric oxide, aluminum oxide and combinations thereof. In further embodiments, the oxidized metal coating is selected from the group consisting of cuprous oxide, cupric oxide and a combination thereof. In certain embodiments, the metal oxide coating does not contain copper phosphate. In particular embodiments, the oxidized metal coating consists essentially of cuprous oxide, cupric oxide or a combination thereof. In particular embodiments, the oxidized metal coating consists essentially of aluminum oxide, titanium oxide, zirconium oxide, manganese oxide ore combinations thereof. In further embodiments, the oxidized metal coating consists essentially of aluminum oxide.

In some embodiments, the thickness of the first layer, comprising the oxidized metal coating is less than about 10 μm. It has been unexpectedly found by the inventors of the present invention that the EPD coating applied to metal oxide coatings thicker than 10 μm did not adequately adhere to the conductive component. In further embodiments, the thickness of the first layer is less than about 9 μm. In yet further embodiments, the thickness of the first layer is less than about 8 μm. In still further embodiments, the thickness of the first layer is less than about 7 μm. In yet further embodiments, the thickness of the first layer is less than about 6 μm. In still further embodiments, the thickness of the first layer is less than about 5 μm. In yet further embodiments, the thickness of the first layer is less than about 4 μm. In still further embodiments, the thickness of the first layer is less than about 3 μm. In yet further embodiments, the thickness of the first layer is less than about 2 μm. In still further embodiments, the thickness of the first layer is less than about 1 μm.

In some embodiments, the thickness of the first layer, comprising the oxidized metal coating is at least about 0.2 μm. In further embodiments, the thickness of the first layer, comprising the oxidized metal coating is at least about 0.2 μm. In still further embodiments, the thickness of the first layer is at least about 0.4 μm. In yet further embodiments, the thickness of the first layer is at least about 0.6 μm. In still further embodiments, the thickness of the first layer is at least about 0.8 μm. In yet further embodiments, the thickness of the first layer is at least about 1 μm. In still further embodiments, the thickness of the first layer is at least about 1.5 μm. The thickness of the first layer can range from about 0.1 μm to about 10 μm. In some embodiments, the thickness of the first layer ranges from about 0.1 μm to about 5 μm.

In some embodiments, the thickness of the first layer ranges from about 0.2 μm to about 10 μm. In further embodiments, the thickness of the first layer ranges from about 0.4 μm to about 9 μm. In yet further embodiments, the thickness of the first layer ranges from about 0.6 μm to about 8 μm. In still further embodiments, the thickness of the first layer ranges from about 0.8 µm to about 7 µm. In yet further embodiments, the thickness of the first layer ranges from about 1 µm to about 5 µm. In still further embodiments, the thickness of the first layer ranges from about 1.5 µm to about 4 µm. In yet further embodiments, the thickness of the first layer ranges from about 1.5 µm to about 2.5 µm. In certain embodiments, the oxidized metal coating is selected from cuprous oxide, cupric oxide or a combination thereof.

In some embodiments, the thickness of the first layer ranges from about 0.1 µm to about 1 µm. In further embodiments, the thickness of the first layer ranges from about 0.2 µm to about 0.8 µm. In yet further embodiments, the thickness of the first layer ranges from about 0.3 µm to about 0.7 µm. In still further embodiments, the thickness of the first layer ranges from about 0.4 µm to about 0.6 µm. In certain embodiments, the oxidized metal coating is selected from aluminum oxide, titanium oxide, zirconium oxide, manganese oxide or any combination thereof.

According to some embodiments, the thickness of the first layer is essentially uniform. The term "essentially uniform", as used herein, refers to the variation in thickness of the first layer of less than about 10%. In some embodiments, the term "essentially uniform" refers to the variation in thickness of the first layer of less than about 7.5%, 5%, 2.5% or 1%. Each possibility represents a separate embodiment of the invention. The conductive component can be selected from a flat lead frame coil or a flat coil projecting from a printed circuit panel.

The first layer covers at least the first surface and the plurality of edges of the conductive component. In some embodiments, at least about 90% of the first surface and the plurality of edges of the conductive component are covered by the first layer. In further embodiments, at least about 95% of the first surface and the plurality of edges of the conductive component are covered by the first layer. In yet further embodiments, at least about 99% of the first surface and the plurality of edges of the conductive component are covered by the first layer. In some embodiments, the first surface and the plurality of edges on the conductive component are completely covered by the first layer. The conductive component can be selected from a flat lead frame coil or a flat coil projecting from a printed circuit panel.

The first layer can further cover the second surface of the conductive component. In some embodiments, at least about 90% of the first surface, the second surface and the plurality of edges of the conductive component are covered by the first layer. In further embodiments, at least about 95% of the first surface, the second surface and the plurality of edges of the conductive component are covered by the first layer. In yet further embodiments, at least about 99% of the first surface, the second surface and the plurality of edges of the conductive component are covered by the first layer. In some embodiments, the first surface, the second surface and the plurality of edges on the conductive component are completely covered by the first layer. In some embodiments, the conductive component is a flat lead frame coil.

In some embodiments, the at least two terminals of the conductive component are not covered by the first layer.

Second Layer Comprising an EPD Insulating Coating

The second layer comprising an EPD insulating coating is disposed on the first layer of the insulated planar transformer component. The second layer provides electrical insulation of the conductive component from the adjacent conductive component or from the ferrite core passing through the conductive component coil. Without wishing to being bound by theory or mechanism of action, the second layer prevents the electrical breakdown of the insulated planar transformer component, in particular at the edges of the conductive component, which are more prone to the electrical breakdown than the first and the second surfaces. According to some embodiments, the second layer has a dielectric strength of at least about 20 KV/mm According to further embodiments, the second layer has a dielectric strength of at least about 30 KV/mm According to still further embodiments, the second layer has a dielectric strength of at least about 40 KV/mm According to yet further embodiments, the second layer has a dielectric strength of at least about 50 KV/mm In some embodiments, the EPD insulating coating is a conformal coating. The term "conformal coating", as used herein, refers to a coating which conforms' to the contours of the conductive component.

The thickness of the second layer can range from about 10 µm to about 50 µm. In certain embodiments, the thickness ranges from about 15 µm to about 40 µm. In some embodiments, the thickness of the second layer is higher than about 15 µm. In further embodiments, the thickness of the second layer is higher than about 20 µm. In still further embodiments, the thickness of the second layer is higher than about 30 µm. In some embodiments, the thickness of the second layer is lower than about 50 µm. In further embodiments, the thickness of the second layer is lower than about 40 µm. In still further embodiments, the thickness of the second layer is lower than about 30 µm.

The second layer covers at least the first surface and the plurality of edges of the conductive component. In some embodiments, at least about 90% of the first surface and the plurality of edges of the conductive component are covered by the second layer. In further embodiments, at least about 95% of the first surface and the plurality of edges of the conductive component are covered by the second layer. In yet further embodiments, at least about 99% of the first surface and the plurality of edges of the conductive component are covered by the second layer. In some embodiments, the first surface and the plurality of edges on the conductive component are completely covered by the second layer. The conductive component can be selected from a flat lead frame coil or a flat coil projecting from a printed circuit panel.

The second layer can further cover the second surface of the conductive component. In some embodiments, at least about 90% of the first surface, the second surface and the plurality of edges of the conductive component are covered by the second layer. In further embodiments, at least about 95% of the first surface, the second surface and the plurality of edges of the conductive component are covered by the second layer. In yet further embodiments, at least about 99% of the first surface, the second surface and the plurality of edges of the conductive component are covered by the second layer. In some embodiments, the first surface, the second surface and the plurality of edges on the conductive component are completely covered by the second layer. In some embodiments, the conductive component is a flat lead frame coil.

In some embodiments, the terminals of the conductive component are not covered by the second layer.

According to some embodiments, the thickness of the second layer is substantially uniform throughout the first surface of the conductive component. According to some embodiments, the thickness of the second layer is substantially uniform throughout the plurality edges of the conductive component. According to some embodiments, the thickness of the second layer is substantially uniform throughout the second surface of the conductive component. The term "substantially uniform thickness", as used herein, refers in some embodiments to the variance in the thickness of the second layer between two different points on the first surface, on the second surface or on the plurality of edges, of less than about 20%. In further embodiments, the term refers to the variance of less than about 15%, less than about 10%, or less than about 5%. Each possibility represents a separate embodiment of the invention.

Without wishing to being bound by theory or mechanism of action, it is contemplated that the substantially uniform thickness of the second layer on the first surface, the plurality of edges, and optionally, on the second surface of the conductive component, increases the immunity of the insulated planar transformer component towards electrical breakdown.

According to further embodiments, the thickness of the second layer on the first surface and on the second surface is substantially similar The term "substantially similar thickness", as used herein, refers in some embodiments, to the variance in the thickness of the second layer on the first surface and on the second surface of less than about 20%. In further embodiments, the term refers to the variance of less than about 15%, less than about 10%, or less than about 5%.

According to some embodiments, the thickness of the second layer on the plurality of edges of the conductive component is higher than on the first surface thereof by at least about 5%. According to further embodiments, the thickness of the second layer on the plurality of edges is higher than on the first surface by at least about 7%. According to still further embodiments, the thickness of the second layer on the plurality of edges is higher than on the first surface by at least about 10%. According to yet further embodiments, the thickness of the second layer on the plurality of edges is higher than on the first surface by at least about 15%. According to still further embodiments, the thickness of the second layer on the plurality of edges is higher than on the first surface by at least about 20%.

According to some embodiments, the thickness of the second layer on the plurality of edges of the conductive component is higher than on the second surface thereof by at least about 5%. According to further embodiments, the thickness of the second layer on the plurality of edges is higher than on the second surface by at least about 7%. According to still further embodiments, the thickness of the second layer on the plurality of edges is higher than on the second surface by at least about 10%. According to yet further embodiments, the thickness of the second layer on the plurality of edges is higher than on the second surface by at least about 15%. According to still further embodiments, the thickness of the second layer on the plurality of edges is higher than on the second surface by at least about 20%.

Without wishing to being bound by theory or mechanism of action, it is contemplated that the higher thickness of the second layer on the plurality of edges increases the immunity of the edges of the insulated planar transformer component towards electrical breakdown.

The second layer comprising the EPD coating comprises a polymer and an inorganic material. The polymer can include any polymer suitable for the application to a conductive surface by electrophoretic deposition. The polymer can be a natural or a synthetic organic polymer. In some embodiments, the polymer is formed from a film forming agent, comprising a polymer, prepolymer, oligomers or monomers. The film forming agent can be cationically or anionically modified in order to facilitate the polymer (or prepolymer, oligomer or monomer) deposition on the conductive surface, which is held at a voltage bias. The polymer of the EPD coating can be heat or radiation-curable. In other embodiments, the polymer is a self-crosslinking polymer.

The non-limiting examples of the polymers suitable for the formation of the EPD insulating coating include polyurethane, acrylic polymers, epoxy, polyester, aminoplast, polybutadiene, polyaryletherketones (e.g. PEEK—polyether ether ketone), polyvinyl butyral (PVB), natural rubber, wax, cellulose, halogenated polymers and combinations thereof. In some embodiments, the EPD insulating coating includes a polymer selected from polyurethane, acrylic polymers, epoxy, polyester, aminoplast, polybutadiene, and combinations thereof. In certain embodiments, the EPD coating is a polyurethane-based coating. According to some embodiments, the polyurethane polymer is cross-linked.

A person skilled in the art will readily understand that the polyurethane-based coating can include a variety of different types of monomers, forming the polyurethane polymer. The monomers can include a backbone unit selected from acrylic, methacrylic, aliphatic, or aromatic units. The monomers can include at least one functional group selected from amine, carbonyl, sulfonate, isocyanate, imide or hydroxyl. Each possibility represents a separate embodiment of the invention.

According to certain embodiments, the polyurethane comprises units selected from acrylate units, methacrylate units, and combinations thereof. In additional embodiments, the acrylate units and the methacrylate units are cationically modified. The EPD process is described in more detail hereinbelow.

The inorganic material can be a ceramic material. Without wishing to being bound by theory or mechanism of action, the inorganic material improves the coverage of the first surface and the second surface, and in particular, the coverage of the plurality of edges, by the second layer. The inorganic material can further be selected to control the thickness uniformity of the second layer on the surfaces and the edges of the conductive components and/or to control the variation in the thickness between the surfaces and the edges. Accordingly, the inorganic material can include any rheology agent suitable for use in the EPD process. The non-limiting examples of said rheology agents include metal oxides. The metal oxides can be selected from alumina ($Al_2O_3$), aluminate, silica ($SiO_2$), silicates, Mica, cerium oxide ($Ce_2O_3$), cerium dioxide ($CeO_2$), yttrium oxide ($Y_2O_3$), and combinations thereof.

Aluminate is an oxyanion of aluminum. The oxyanions of aluminum can include, but are not limited to, $AlO_4^{5-}$ ion, $AlO^{2-}$ ion, $AlO_2^-$ ion, $Al_2O_4^{2-}$ ion, $Al_6O_{18}^{18-}$ ion, $Al_2O_6^{6-}$ ion, $Al_3O_8^{7-}$ ion, $Al_{13}O_{10}^{7-}$ ion or $Al_5O_{16}^{17-}$ ion. Aluminates can be present in a form of an alkali metal salt, such as, for example, sodium aluminate or potassium aluminate, or in a form of an alkaline earth metal salt, such as, but not limited to, calcium aluminate or magnesium aluminate.

A silicate is a compound containing an anionic silicon compound. The anionic silicon compounds include, inter alia, oxides and fluorides. The non-limiting examples of silicon oxide ions include $SiO_4^{4-}$, $Si_2O_7^{6-}$, $Si_6O_{18}^{12-}$, and $SiO_5^{6-}$. Silicates can be present in a form of an alkali metal salt, such as, for example, sodium silicate or potassium silicate, or in a form of an alkaline earth metal salt, such as, but not limited to, calcium silicate or magnesium silicate.

In some embodiments, the EPD insulating coating includes an inorganic material selected from alumina, aluminate, silica, silicate or combinations thereof. In certain embodiments, the EPD insulating coating includes alumina.

In some embodiments, the inorganic material is nanosized. The term "nanosized", as used herein, refers to an average particle size of less than about 1000 nm, particularly less than about 500 nm, more particularly between about 1 nm to about 200 nm. In certain embodiments, the EPD insulating coating includes nanosized alumina.

Without wishing to being bound by theory or mechanism of action, the inorganic material increases the thermal conductivity of the second layer. Thus, according to some embodiments, the inorganic material can be any material having a high thermal conductivity, such as, for example equal to or higher than 15 W/m·K. In certain such embodiments, the inorganic material can be selected from alumina, boron nitride (BN) or a combination thereof. In some embodiments, the rheology agent can be further used to increase the thermal conductivity of the second layer Insulated Transformer Component The electrically insulated component for use in a planar transformer, according to the principles of the present invention, comprises the planar transformer conductive component, comprising the first surface, the second surface and the plurality of edges, the first layer comprising an oxidized metal coating and a second layer comprising an EPD coating. The first layer and the second layer cover at least the first surface and the plurality of edges of the conductive component and the first layer is disposed between the conductive component and the second layer. In some embodiments, the first layer and the second layer further cover the second surface of the conductive component. The conductive component can further include at least two terminals The terminals can be disposed adjacent to one edge or different edges of the plurality of edges of the conductive component. In further embodiments, the terminals are not covered by the first layer and/or the second layer. In certain embodiments, a passivation layer is applied to the at least two terminals.

According to some currently preferred embodiments, the second layer is adhered to the first surface of the conductive component and the plurality of edges, and optionally to the second surface of the conductive component, by means of forming a first layer on said parts of the conductive component and by using an EPD process. Accordingly, in various embodiments of the present invention, the electrically insulated component for use in a planar transformer does not include a binding agent between the second layer, comprising the insulating EPD coating, and the conductive component first surface, plurality of edges, and optionally, the second surface. The binding agent can be polymer-based or resin-based, such as, but not limiting to, glue.

Figure 3A:
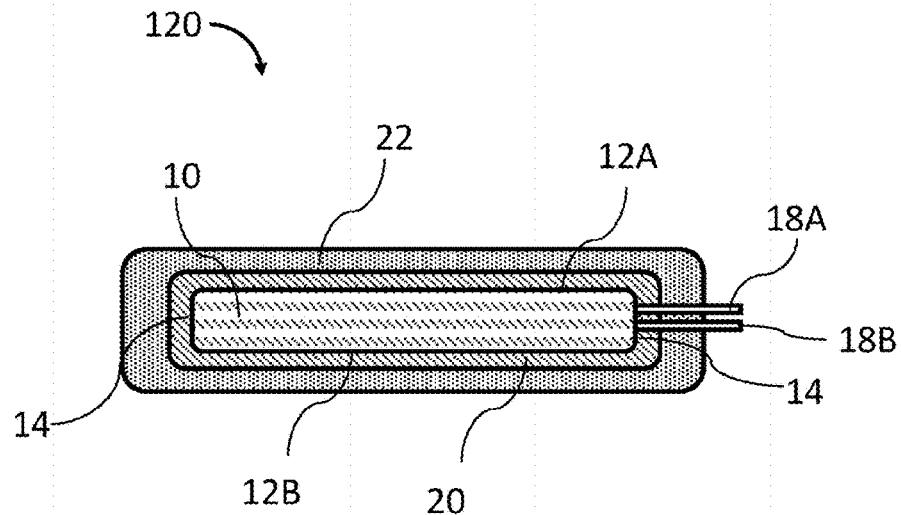
FIG. 3A: Schematic representation of the cross-sectional view of the insulated flat lead frame coil, according to some embodiments of the present invention.

FIG. 3a schematically represents a cross-sectional view of insulated planar transformer component 120, according to some embodiments of the invention. Insulated planar transformer component 120 includes lead frame coil 10, as shown in FIG. 1, wherein the cross section is made along line CC. Insulated planar transformer component 120 further includes first layer 20, disposed on first surface 12A, on second surface 12B, and plurality of edges 14 of lead frame coil 10. Insulated planar transformer component 120 further includes second layer 22, disposed on first layer 20. Terminals 18A and 18B are not covered by first layer 20 and second layer 22. Thickness of second layer 22 on edges 14 can be higher than on first surface 12A of lead frame coil 10.

Figure 3B:
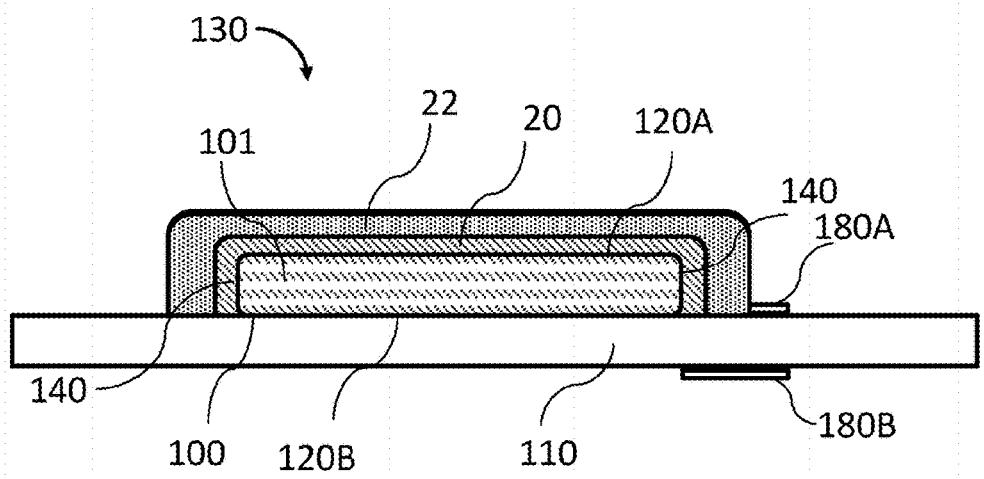
FIG. 3B: Schematic representation of the cross-sectional view of the insulated flat coil projecting from a printed circuit panel, according to some embodiments of the present invention.

FIG. 3b schematically represents a cross-sectional view of insulated planar transformer component 130, according to some embodiments of the invention. Insulated planar transformer component 130 includes PCB flat coil 100, as shown in FIG. 2A, wherein the cross-section is made along line DD. PCB flat coil 100 includes flat coil 101 disposed on printed circuit panel 110, wherein second surface 120B of flat coil 101 is adjacent to printed circuit panel 110. Insulated planar transformer component 130 further includes first layer 20, disposed on first surface 120A and plurality of edges 140 of flat coil 101. Insulated planar transformer component 120 further includes second layer 22, disposed on first layer 20. Thickness of second layer 22 on edges 140 can be higher than on first surface 120A of lead frame coil 101. Terminals 180A and 180B are not covered by first layer 20 and second layer 22. Printed circuit panel 110 is also not covered by first layer 20 and second layer 22.

Figure 3C:
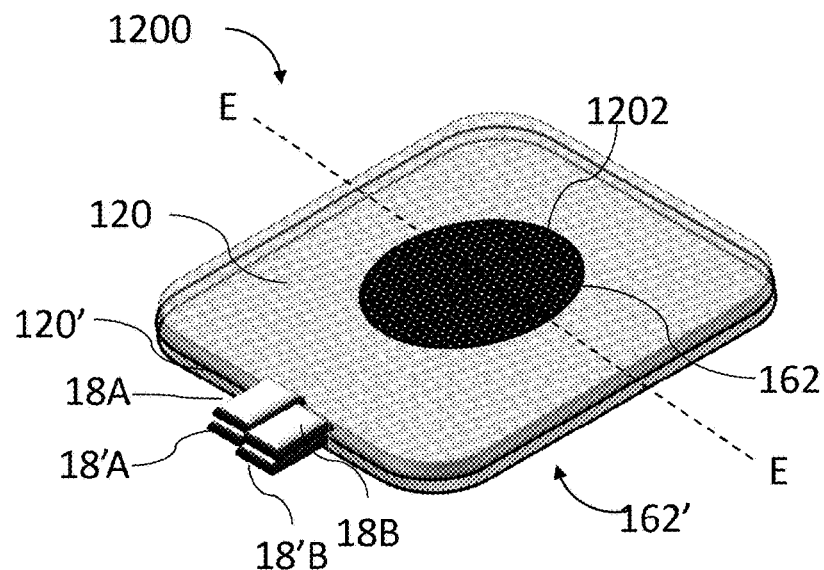
FIG. 3C: Schematic representation of the planar transformer, including a plurality of insulated lead frame coils and a ferrite core, according to some embodiments of the present invention.

FIG. 3c schematically represents planar transformer 1200 including a plurality of insulated planar transformer components 120 and 120' and ferrite core 1202, according to some embodiments of the invention. Insulated planar transformer component 120 includes terminals 18A and 18B, which are not covered by the insulating layer. Insulated planar transformer component 120' includes terminals 18'A and 18'B, which are not covered by the insulating layer. Insulated planar transformer components 120 and 120' are stacked in a pillar. Ferrite core 1202 protrudes through apertures 162 and 162' of insulated planar transformer components 120 and 120', respectively.

Figure 3D:
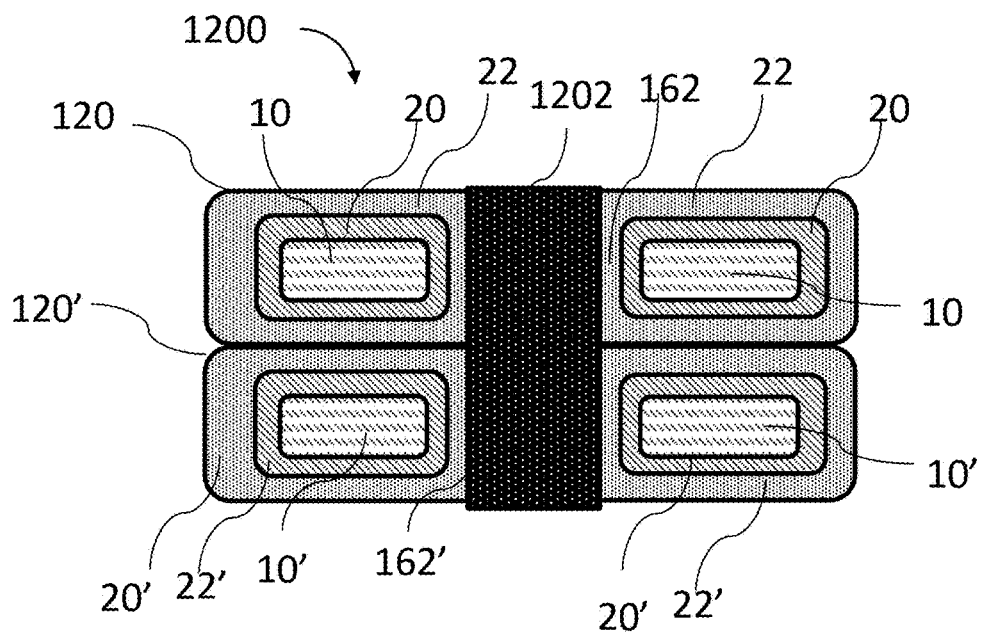
FIG. 3D: Schematic representation of the cross-sectional view of the planar transformer of FIG. 3C, including a plurality of insulated lead frame coils and a ferrite core, according to some embodiments of the present invention.
Figure 3E:
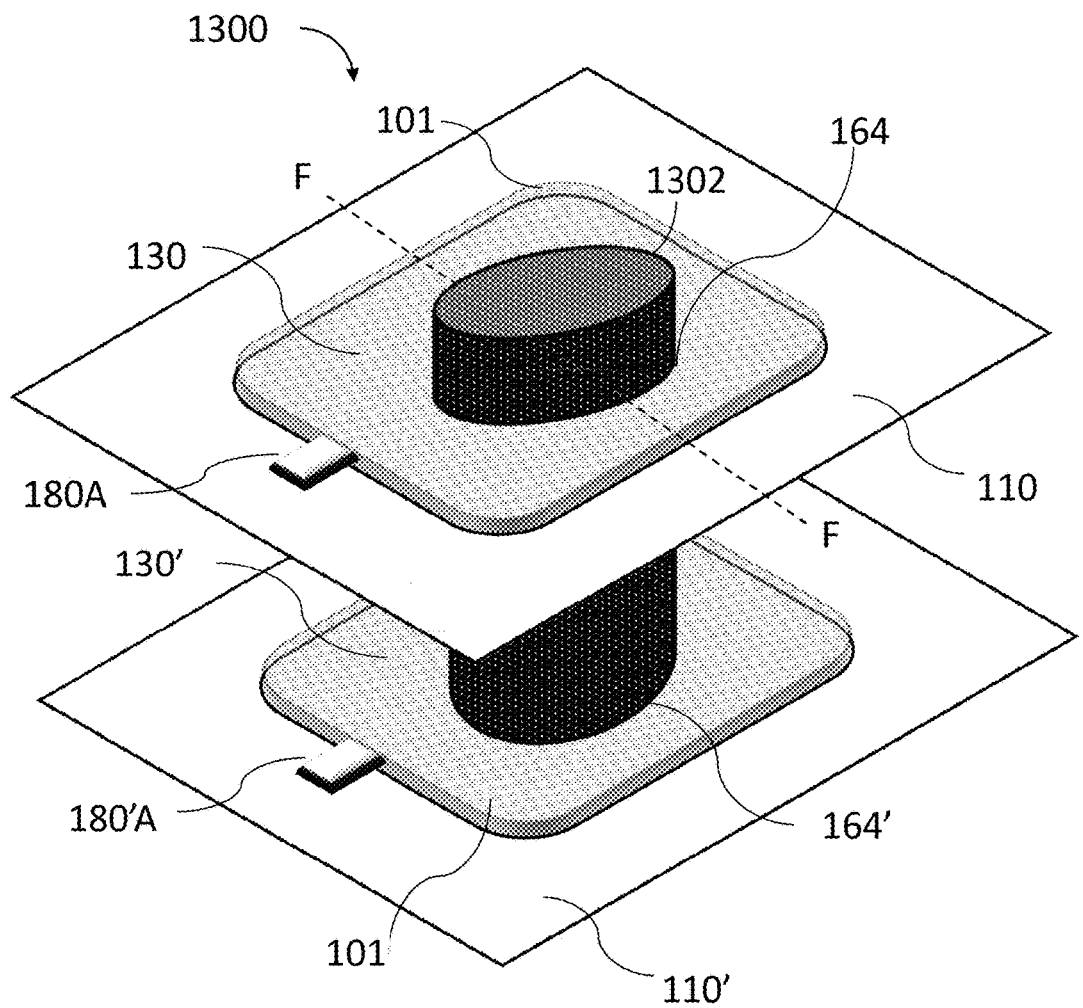
FIG. 3E: An exploded view of the planar transformer, including a plurality of insulated flat coils projecting from a printed circuit panel and a ferrite core, according to some embodiments of the present invention.

FIG. 3d schematically represents a cross-sectional view of planar transformer 1200 shown in FIG. 3c, according to some embodiments of the invention. The cross-section is made along line EE in FIG. 3c. Planar transformer 1200 includes a plurality of insulated planar transformer components 120 and 120' and ferrite core 1202. Insulated planar transformer component 120 includes lead frame coil 10, first layer 20 disposed on lead frame coil 10 and second layer 22, disposed on first layer 20. Insulated planar transformer component 120' includes lead frame coil 10', first layer 20' disposed on lead frame coil 10' and second layer 22', disposed on first layer 20'. Insulated planar transformer components 120 and 120' are stacked in a pillar and are connected along second layers 22 and 22'. Ferrite core 1202 protrudes through apertures 162 and 162' of insulated planar transformer components 120 and 120', respectively. p FIG. 3e schematically represents an exploded view of planar transformer 1300 including a plurality of insulated planar transformer components 130 and 130' and ferrite core 1302, according to some embodiments of the invention. Insulated planar transformer component 130 includes flat coil 101 having an insulating layer and being disposed on printed circuit panel 110. Flat coil 101 includes terminal 180A and another terminal (hidden from view), which are not covered by the insulating layer. Insulated planar transformer component 130' includes flat coil 101' having an insulating coating and being disposed on printed circuit panel 110'. Flat coil 101' includes terminal 180'A and another terminal (hidden from view), which are not covered by the insulating layer. Insulated planar transformer components 130 and 130' are stacked in a pillar. Ferrite core 1302 protrudes through apertures 164 and 164' of insulated planar transformer components 130 and 130', respectively.

Figure 3F:
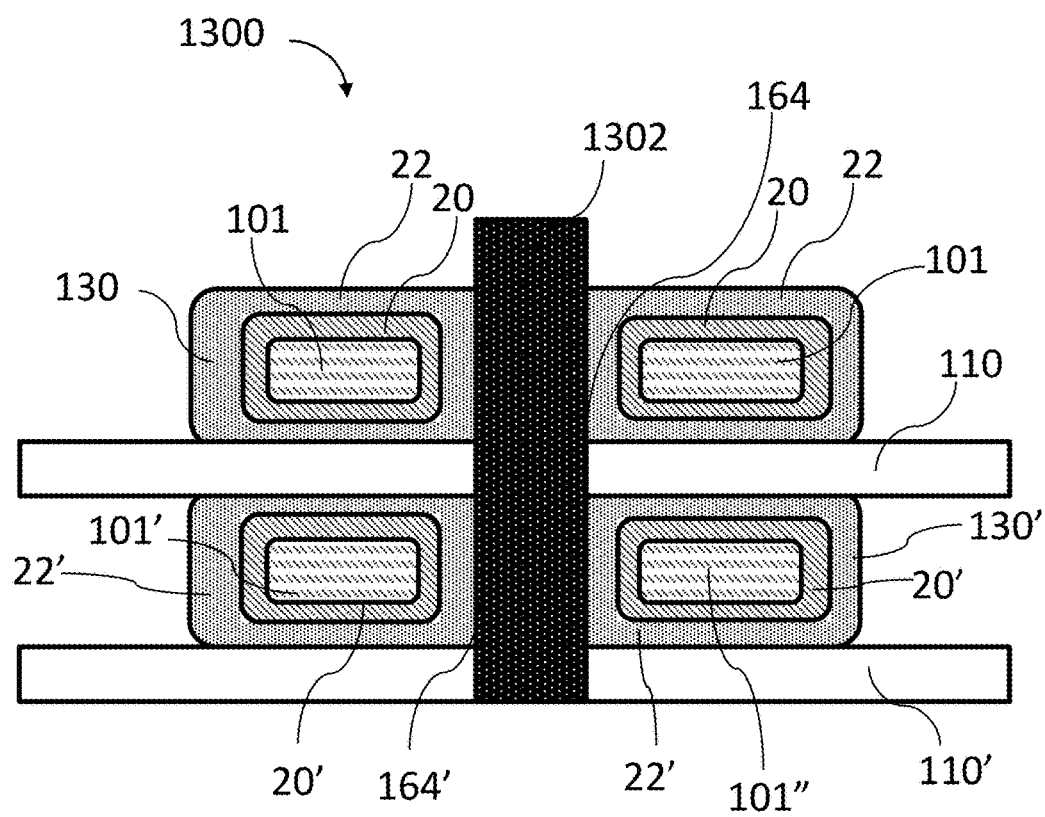
FIG. 3F: Schematic representation of the cross-sectional view of the planar transformer of FIG. 3E, including a plurality of insulated flat coils projecting from a printed circuit panel and a ferrite core, according to some embodiments of the present invention.

FIG. 3f schematically represents a cross-sectional view of planar transformer 1300 shown in FIG. 3e, according to some embodiments of the invention. The cross-section is made along line FF in FIG. 3e. Planar transformer 1300 includes a plurality of insulated planar transformer components 130 and 130' and ferrite core 1302. Insulated planar transformer component 130 includes flat coil 101 disposed on printed circuit panel 110. Insulated planar transformer component 130 further includes first layer 20 disposed on flat coil 101 and second layer 22, disposed on first layer 20. Insulated planar transformer component 130' includes flat coil 101' disposed on printed circuit panel 110'. Insulated planar transformer component 130' further includes first layer 20' disposed on flat coil 101' and second layer 22, disposed on first layer 20. Insulated planar transformer components 130 and 130' are stacked in a pillar and are connected along second layer 22' and printed circuit panel 110. Ferrite core 1302 protrudes through apertures 164 and 164' of insulated planar transformer components 130 and 130', respectively.

According to some embodiments, the invention further provides a planar transformer, comprising a plurality of insulated components according to the principles of the present invention and a ferrite core. In further embodiments, the planar transformer comprises from about 1 to about 100 insulated components.

In some embodiments, the planar transformer comprises a plurality of flat lead frame coils. In further embodiments, the plurality of flat lead frame coils are stacked in a pillar, connected along the second layers of the adjacent insulated components. In further embodiments, the ferrite core projects through the apertures of the plurality of lead frame coils.

In some embodiments, the planar transformer comprises a plurality of flat coils projecting from the printed circuit panel. In certain such embodiments, one printed circuit panel can include up to about 300 coils, projecting from said panel, up to about 400 coils, or even up to about 500 coils. Each possibility represents separate embodiment of the invention. In some embodiments, the print circuit panel comprises at least about 50 coils projecting from said panel, at least about 100 coils or at least about 200 coils. Each possibility represents separate embodiment of the invention.

In some embodiments, the planar transformer comprises a plurality of flat coils projecting from the plurality of printed circuit panels. In further embodiments, the plurality of insulated components are stacked in a pillar, connected along the second layer and the printed circuit panel of adjacent insulated components. In other embodiments, the plurality of insulated components are stacked in a pillar, connected along the second layers of the adjacent insulated components. In certain such embodiments, the printed circuit panel comprises flat coils on both sides thereof. In further embodiments, the ferrite core projects through the apertures of the plurality of flat coils.

Method of Manufacturing

In another aspect the invention provides a method of manufacturing of an electrically insulated component for use in a planar transformer, the method comprising providing a planar transformer conductive component having a first surface, a second surface and a plurality of edges; forming a first layer on at least the first surface and the plurality of edges of the conductive component by exposing the conductive component to an oxidizing solution or a conversion coating solution; and forming a second layer on the first layer by an electrophoretic deposition (EPD) process from a liquid dispersion comprising a film-forming agent and a rheology agent.

In yet another aspect there is provided a method of manufacturing an electrically insulated component for use in a planar transformer, the method comprising providing a planar transformer conductive component having a first surface, a second surface and a plurality of edges; forming a first layer on at least the first surface and the plurality of edges of the conductive component by exposing the conductive component to an electrical oxidation process; and forming a second layer on the first layer by an electrophoretic deposition (EPD) process from a liquid dispersion comprising a film-forming agent and a rheology agent.

The step of providing a planar transformer conductive component can include providing a flat lead frame coil or a flat coil projecting from a printed circuit panel. Each possibility represents a separate embodiment of the invention.

The step of providing a planar transformer conductive component can include any preparation method knows in the art, inter alia, photolithography, molding, casting, punching, cutting, or chemical etching. In some embodiments, the flat coil projecting from a printed circuit panel is prepared by photolithography. In some embodiments, the flat lead frame coil is prepared by molding, casting, punching or cutting. As mentioned hereinabove, the conductive component can be made in any shape and of electrically conductive material, such as, but not limited to copper or aluminum. In certain embodiments the conductive component is made of copper.

The as-prepared conductive component can have substantially pointed edges. In some embodiments, the method of manufacturing includes rounding off the plurality of edges of the conductive component. The edges can be rounded off by a procedure selected from, but not limited to, electro polishing, mechanical rubbing, mechanical vibrating or combinations thereof.

The first layer is formed at least on the first surface and on the plurality of edges of the conductive component. In certain embodiments, the method includes formation of the first layer on the second surface of the conductive component. In certain such embodiments, the conductive component is a flat lead frame coil.

Oxidizing Solution

The step of forming a first layer on at least the first surface and the plurality of edges of the conductive component can include exposing the conductive component to the oxidizing solution by any method known in the art. In certain such embodiments, the conductive component is made of copper. The non-limiting examples of said methods include dipping, spraying, or brushing. The terms "dipping" and "immersing" are used interchangeably throughout the specification. In some embodiments, the step of forming a first layer comprises dipping the conductive component in the oxidizing solution. In further embodiments, the step of forming a first layer comprises dipping the conductive component in the oxidizing solution for about 1 to about 5 minutes. In certain embodiments, the step of forming a first layer comprises dipping the conductive component in the oxidizing solution for at least about 1 minute, for at least about 2 minutes, for at least about 3 minutes, or for at least about 4 minutes. Each possibility represents a separate embodiment of the invention.

In some embodiments, the oxidizing solution temperature is from about 60° C. to about 80° C. In further embodiments, the oxidizing solution temperature is from about 65° C. to about 77° C. In further embodiments, the oxidizing solution temperature is from about 70° C. to about 75° C.

In some embodiments, the oxidizing solution is aqueous-based. Without wishing to being bound by theory or mechanism of action, it is contemplated that the specific composition of the oxidation solution allows formation of the first layer, which provides adequate adhesion of the second layer to the conductive component. In some embodiments, the oxidation solution comprises a chlorine oxyanion. The chlorine oxyanion can be selected from chlorite, hypochlorite, chlorate, perchlorate or combinations thereof. Each possibility represents a separate embodiment of the invention.

In some embodiments, the oxidizing solution comprises chlorite anion. In further embodiments, the oxidizing solution comprises from about 10% (w/w) to about 30% (w/w)

chlorite anion. In still further embodiments, the oxidizing solution comprises from about 15% (w/w) to about 22% (w/w) chlorite anion.

In some embodiments, the oxidizing solution comprises at least about 10% (w/w) chlorite anion. In further embodiments, the oxidizing solution comprises at least about 15% (w/w) chlorite anion.

The chlorine oxyanion can be in a form of an alkali metal salt or an alkaline earth metal salt. Each possibility represents a separate embodiment of the invention. The alkali metal salt can include, inter alia, a sodium or potassium cation and the chlorine oxyanion. The alkaline earth metal salt can include, for example, a calcium or magnesium cation and the chlorine oxyanion.

In certain embodiments, the oxidizing solution comprises sodium salt of the chlorine oxyanion. In some exemplary embodiments, the oxidizing solution comprises sodium chlorite. In further embodiments, the oxidizing solution comprises from about 10% (w/w) to about 40% (w/w) sodium chlorite. In still further embodiments, the oxidizing solution comprises from about 15% (w/w) to about 35% (w/w) sodium chlorite. In yet further embodiments, the oxidizing solution comprises from about 20% (w/w) to about 30% (w/w) sodium chlorite. In still further embodiments, the oxidizing solution comprises from about 23% (w/w) to about 27% (w/w) sodium chlorite.

In some embodiments, the oxidizing solution comprises at least about 10% (w/w) sodium chlorite. In further embodiments, the oxidizing solution comprises at least about 15% (w/w) sodium chlorite. In still further embodiments, the oxidizing solution comprises at least about 20% (w/w) sodium chlorite.

In some embodiments, the oxidizing solution includes an additional alkaline component. In some embodiments, the oxidizing solution further comprises an alkali metal hydroxide. The alkali metal can be selected from sodium or potassium. In some exemplary embodiments, the oxidizing solution comprises sodium hydroxide. In further embodiments, the oxidizing solution comprises from about 10% (w/w) to about 30% (w/w) sodium hydroxide. In yet further embodiments, the oxidizing solution comprises from about 15% (w/w) to about 25% (w/w) sodium hydroxide. In still embodiments, the oxidizing solution comprises from about 18% (w/w) to about 22% (w/w) sodium hydroxide.

In some exemplary embodiments, the oxidizing solution comprises sodium chlorite and sodium hydroxide.

The oxidizing solution can further include trisodium phosphate. The concentration of trisodium phosphate in the oxidizing solution can range from about 2% (w/w) to about 5% (w/w).

In particular embodiments, the oxidizing solution comprises from about 20% (w/w) to about 30% (w/w) sodium chlorite and from about 15% (w/w) to about 25% (w/w) sodium hydroxide. In further embodiments, the oxidizing solution comprises from about 20% (w/w) to about 30% (w/w) sodium chlorite, from about 15% (w/w) to about 25% (w/w) sodium hydroxide and from about 2% (w/w) to about 5% (w/w) trisodium phosphate.

Conversion Coating Solution

The step of forming a first layer on at least the first surface and the plurality of edges of the conductive component can include exposing the conductive component to the conversion coating solution as known in the art. In certain such embodiments, the conductive component is made of aluminum. The non-limiting examples of exposing the conductive components to the conversion coating solution include dipping, spraying, or brushing. In some embodiments, the step of forming a first layer comprises dipping the conductive component in the conversion coating solution. In further embodiments, the step of forming a first layer comprises dipping the conductive component in the conversion coating solution for about 5 seconds to about 5 minutes. In further embodiments, the step of forming a first layer comprises dipping the conductive component in the conversion coating solution for about 15 seconds to about 4 minutes. In still further embodiments, the step of forming a first layer comprises dipping the conductive component in the conversion coating solution for about 30 seconds to about 3 minutes. In yet further embodiments, the step of forming a first layer comprises dipping the conductive component in the conversion coating solution for about 60 seconds to about 2 minutes.

In some embodiments, the conversion coating solution temperature is from about 18° C. to about 30° C. In certain embodiments, conversion coating is performed at room temperature.

In some embodiments, the conversion coating solution is aqueous-based.

In some embodiments, the conversion coating solution comprises a transition metal salt. The non-limiting examples of the metal salt include manganese salt or zirconium salt. In certain embodiments, said manganese salt is a potassium permanganate salt. The concentration of the transition metal salt can be below about 10% (w/w). In some embodiments, the concentration is below about 5% (w/w). In certain embodiments, the concentration is below about 2.5% (w/w). In some embodiments, the conversion coating solution comprises a transition metal acid. A non-limiting example of said transition metal acid is hexafluorotitanic acid. The concentration of the transition metal acid can be below about 10% (w/w). In some embodiments, the concentration is below about 5% (w/w). In certain embodiments, the concentration is below about 2.5% (w/w). In certain embodiments, the conversion coating solution includes hexafluorotitanic acid and potassium permanganate salt.

Electrical Oxidation

The step of forming a first layer on at least the first surface and the plurality of edges of the conductive component can include electrical oxidation of the conductive component by any method known in the art. In certain such embodiments, the conductive component is made of aluminum. According to some embodiments, the electrical oxidation includes anodizing process. The anodized aluminum layer can be grown on the conductive component by passing a direct current through an electrolytic solution, with the conductive component serving as the anode (the positive electrode). The current releases hydrogen at the cathode (the negative electrode) and oxygen at the surface of the aluminum anode, creating a build-up of aluminum oxide. The voltage typically ranges between 15 and 21 V. Higher voltages are typically required for thicker coatings formed in sulfuric and organic acid. Aluminum anodizing is usually performed in an acid solution, which slowly dissolves aluminum oxide. The acid action is balanced with the oxidation rate to form a coating with nanopores. In some embodiments, the nanopores of the coating range from about 10 nm to about 150 nm in diameter.

In alternative embodiments, the electrical oxidation process includes plasma electrolytic oxidation (PEO).

Electrophoretic Deposition

Electrophoretic deposition involves the deposition of materials from a liquid medium on to an immersed electroconductive surface by application of an electrical field. The materials can be natural, modified or refined natural materials, or wholly synthetic materials, or mixtures of these. The electrophoretic motion of the materials is determined by an electrostatic charge on their surface, which may be natural or imposed. The polarity of the electrostatic charge thereby determines which immersed electrode they will migrate towards, it being oppositely charged. The electrical field may be the result of a constant, varying or pulsed direct current voltage; or constant or varying balanced or unbalanced alternating current; or other simple or compound waveforms. Examples of suitable materials for EPD can be ceramics in particulate forms; or organic polymers and/or their precursors, in soluble or disperse form. The liquid medium can be water, or organic solvents or ionic liquids; or some combination of these. In some currently preferred embodiments, the EPD liquid dispersion is an aqueous-based dispersion. The deposits so formed may require coalescence and further chemical reactions to form a continuous coating. Some of the materials capable of EPD can serve as dielectrics of use in this invention.

The EPD process is performed in a coating tank (also termed "bath"), which is filled with the liquid dispersion. According to some embodiments, the conductive component is positioned in the center of the tank and connected to a first pole of a DC power source. The tank further includes two electrodes connected to a second pole of said power source. The two electrodes are generally positioned at equal distances from the conduct component. In some embodiments, the total surface area of the two electrodes is substantially similar to the surface area of the conductive component.

In some embodiments, the conductive component is connected to the power supply and completely immersed into the liquid dispersion. In some embodiments, the first surface, the second surface and the plurality of edges of the conductive component are completely immersed into the liquid dispersion during the EPD process. In some embodiments, the planar transformer conductive component is a flat coil projecting from the printed circuit panel. In further embodiments, the planar transformer conductive component comprises a plurality of flat coils projecting from the printed circuit panel. In certain such embodiments, the at least two terminals of the plurality of flat coils are electrically connected during the EPD process. Without wishing to being bound by theory or mechanism of action, formation of the EPD coating on the printed circuit panel comprising a plurality of flat coils, projecting therefrom, is afforded by the position of the terminals of the coils on the printed circuit panel. In regular printed circuit boards, conductive components terminals are distributed throughout the printed circuit panel. In the printed circuit panels comprising the coils according to the principles of the present invention, the terminals of the coils are arranged in a particular manner, which allows convenient electrical connection of the terminals of all of the coils.

Figure 4A:
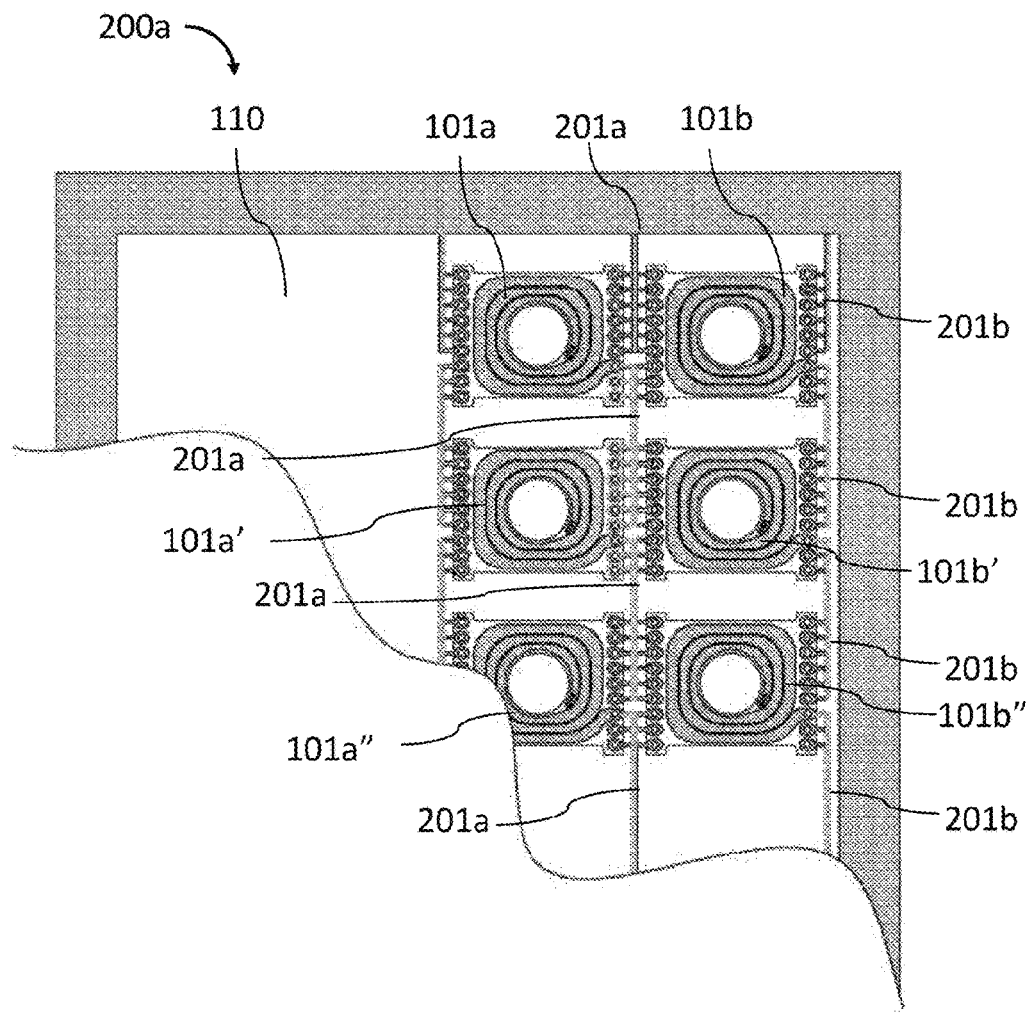
FIGS. 4A-4D: Schematic representation of the flat coil projecting from a printed circuit panel (FIG. 4A—top side, FIG. 4B—bottom side, FIG. 4C—enlargement of the top side, FIG. 4D—enlargement of the bottom side), wherein the terminals of the coils are electrically connected, according to some embodiments of the invention.
Figure 4B:
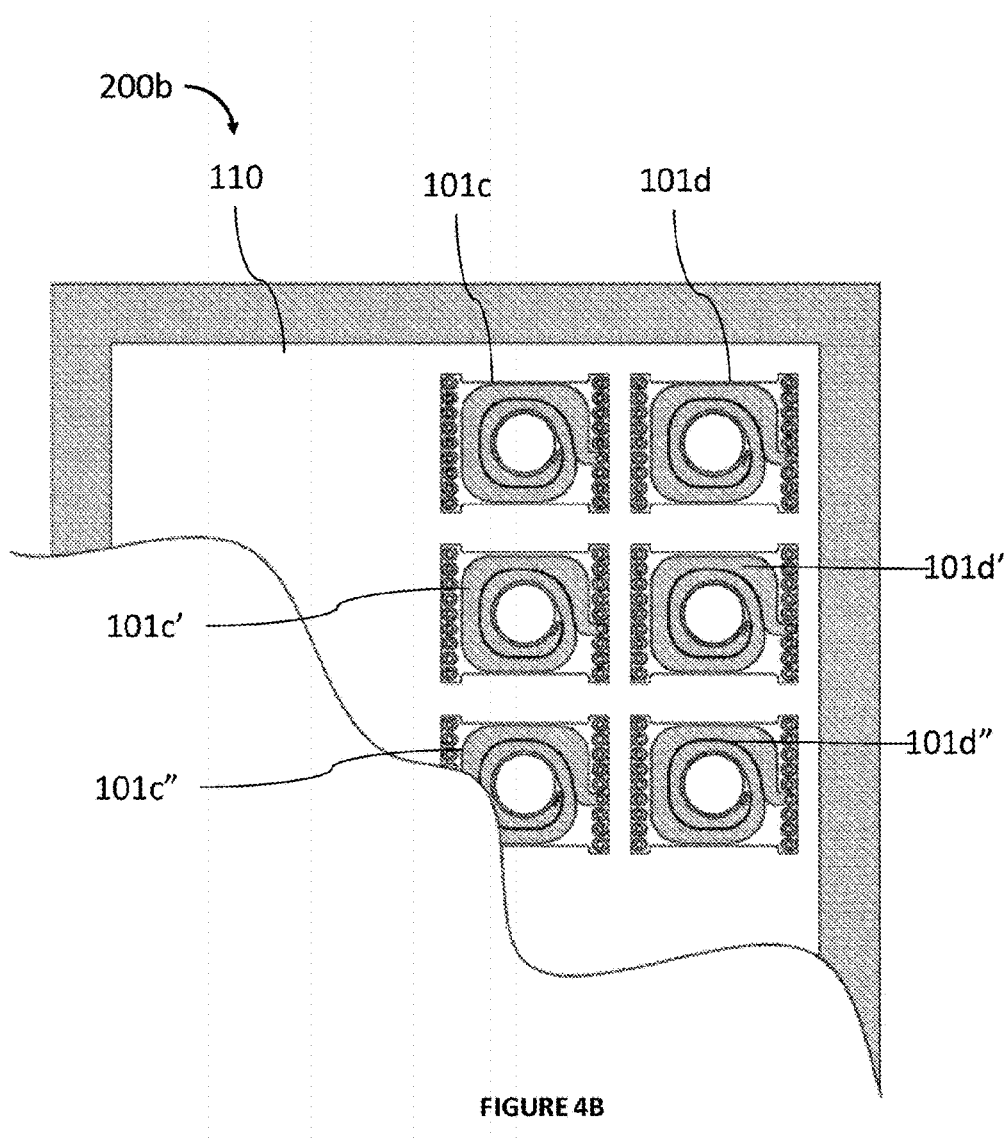

FIGS. 4A-4D show said arrangement of the terminals connection, according to some embodiments of the invention. FIG. 4A schematically illustrates top side 200a of a planar transformer conductive component comprising printed circuit panel 110 comprising a plurality of flat coils 101a, 101a', 101a", positioned in a first column, and a plurality of flat coils 101b, 101b' and 101b", positioned in a second column, wherein the flat coils project from printed circuit panel 110. FIG. 4B schematically illustrates bottom side 200a of a planar transformer conductive component comprising printed circuit panel 110 comprising a plurality of flat coils 101c, 101c' and 101c", positioned in a first column, and a plurality of flat coils 101d, 101d' and 101d', positioned in a second column, wherein the flat coils project from printed circuit panel 110. The plurality of flat coils 101a, 101a' and 101a", positioned on top side 200a of the conductive component corresponds to the plurality of flat coils 101c, 101c' and 101c", positioned on bottom side 200b of the conductive component. The plurality of flat coils 101b, 101b' and 101b", positioned on top side 200a of the conductive component corresponds to the plurality of flat coils 101d, 101d' and 101d", positioned on bottom side 200b of the conductive component.

Figure 4C:
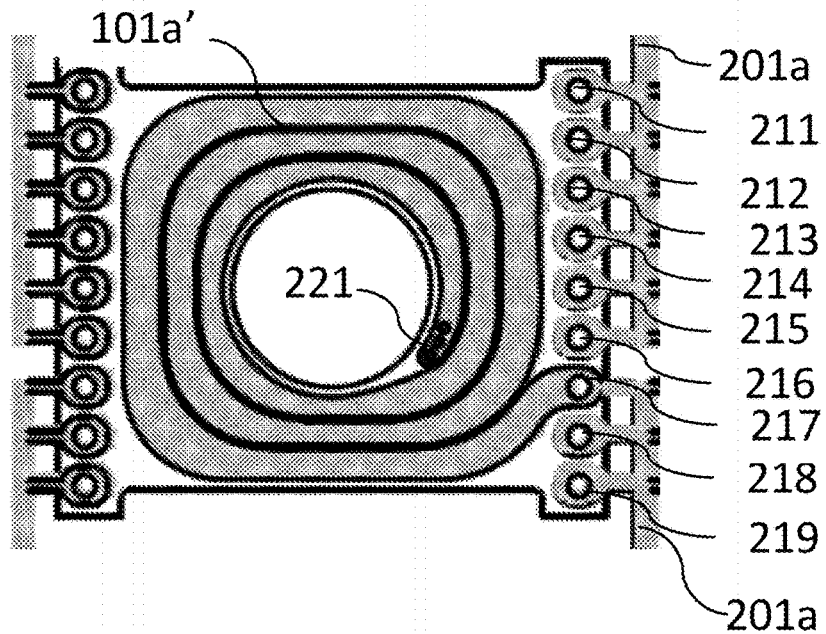
Figure 4D:
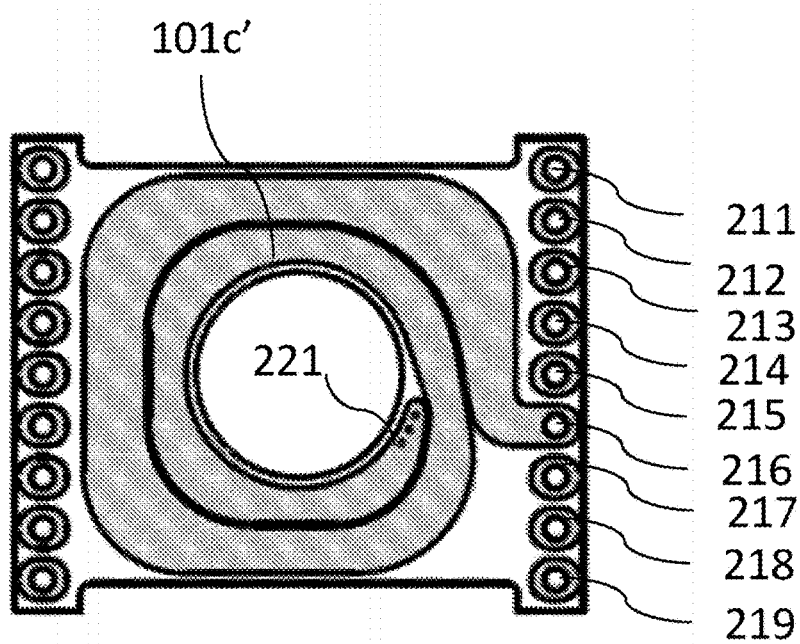

The conductive component further includes a plurality of plated through holes 211, 212, 213, 214, 215, 216, 217, 218 and 219, as can be seen on FIGS. 4C and 4D. Said plated through holes electrically connect top side 200a and bottom side 200b of the conductive component. The conductive component further includes a plurality of plated through holes 221, disposed on the end point of flat coils 101a' and 101c'. Plated through holes 221 electrically connect flat coil 101a' positioned on top side 200a of the conductive component with flat coil 101c' positioned on bottom side 200b of the conductive component. The same applies to the connection via plated through holes 221 of flat coil 101a with flat coil 101c, flat coil 101a" with flat coil 101c", flat coil 101b with flat coil 101d, flat coil 101b' with flat coil 101d', and flat coil 101b" with flat coil 101d", which are not shown in FIGS. 4C and 4D.

During the EPD process plated through hole 216 can be electrically connected to the starting point of flat coil 101c' and plated through hole 217 can be electrically connected to the starting point of flat coil 101a'. Plated through hole 216 can be further electrically connected to other plated through holes, including 211, 212, 213, 214, and 215, as well as to the plated through holes of flat coil 101a, including the plated through hole, which is connected to the starting point of flat coil 101a, as shown in FIG. 4A. Said electrical connection forms conductive path 201a on top side 200a of the conductive component. Plated through hole 217 can be further electrically connected to plated through holes 218 and 219, as well as to the plated through holes of flat coil 101a", including the plated through hole, which is connected to the starting point of flat coil 101d", as shown in FIGS. 4A and 4B. Said electrical connection continues conductive path 201a on top side 200a of the conductive component. Accordingly, conductive path 201a electrically connects the starting point of flat coil 101a' (plated through hole 216) positioned on top side 200a of the conductive component with the starting point of flat coil 101d", positioned on bottom side 200b of the conductive component. Conductive path 201 further electrically connects the starting point of flat coil 101c' positioned on bottom side 200b of the conductive component with the starting point of flat coil 101a, positioned on top side of the conductive component. Since flat coil 101a' is electrically connected to flat coil 101c' through plated through holes 221, disposed in the end point of said flat coils, conductive path 201a is continuous throughout the first column of the conductive component, thereby enabling simultaneous electrophoretic deposition of the plurality of flat coils 101a, 101a', 101a", 101c, 101c' and 101c". The same applies to the second column, in which flat coils 101b, 101b', 101b", 101d, 101d', and 101d"' are electrically connected via the plurality of plated through holes 221 and can be further electrically connected via conductive path 201b during the EPD process. In some embodiments, the liquid dispersion is in a form of a colloidal dispersion. The term "colloidal dispersion", as used herein, refers to an essentially homogeneous dispersion of the film-forming material particles in a continuous liquid dispersion medium, wherein the mean particle size of the film-forming agent is in the range of from about 1 nm to about 1000 nm. According to some embodiments, the film-forming agent particles do not settle or float in the colloidal dispersion. According to additional embodiments, the colloidal dispersion does not require vigorous and/or constant agitation.

The term "essentially homogeneous dispersion", as used herein, refers in some embodiments to the variation in the film-forming agent concentration in the liquid dispersion throughout the coating tank of less than about 10%. In further embodiments, the concentration variation is less than about 5%. In further embodiments, the liquid dispersion is maintained essentially homogeneous during the entire EPD process.

The film-forming agents suitable for use in the EPD process can include natural materials, such as rubbers, waxes, alkyds, cellulose and phenolics or synthetic materials, such as, epoxies, acrylics, polyesters, polyurethanes, polybutadienes, polyaryletherketones, PVB, and halogenated polymers. In some embodiments, the film-forming agent comprises a polymer, prepolymer, oligomer, monomer or combinations thereof. Is some embodiments, the film-forming material is a synthetic polymer. In some embodiments, the film-forming material comprises an oligomer or prepolymer, which react to form a synthetic polymer on the conductive component. The prepolymer can comprise a blocked polymer. Suitable blocking agents are those known in the art, for example phenols, alcohols, ketoxines, pyrosoles, malonates, amines and combinations thereof.

In some embodiments, the film-forming material comprises a polymer, which reacts to form a polymer resin on the conductive component. The film-forming material can further include a transesterifiable material containing at least two ester groups per molecule. The non-limiting examples of transesterifiable material include phenol, urea, melamine, benzoguanine, and blocked polyisocyanates.

In certain embodiments, the synthetic polymer is polyurethane. The non-limiting examples of monomers or prepolymers suitable for the formation of polyurethane include polyols and isocyanates. Isocyanates can include polyisocyanates. The isocyanate can be a blocked isocyanate. Blocked isocyanates are typically formed by the reaction of an isocyanate with either an active hydrogen or methylene compound such as malonic esters.

In a typical EPD process, a film-forming agent is dispersed in a liquid medium and is stabilised with a net negative or positive electrostatic charge that determines its electrophoretic direction. Accordingly, the film-forming agent can be functionalised specifically for electrophoretic deposition from aqueous dispersion. In some embodiments, the synthetic polymer, prepolymer, oligomer or monomer is cationically or anionically functionalized. The non-limiting examples of suitable functional groups include amine, carbonyl, sulfonate, isocyanate, imide, hydroxyl and combinations thereof. Upon application of direct current via immersed electrodes, the film-forming agent electrophoretically deposits onto the electrode of opposite charge to its own.

In certain embodiments, the conductive component is made of copper. Cathodic EPD coating is generally more suitable for copper substrates than anodic EPD. Accordingly, in some currently preferred embodiments, the conductive component is connected to a negative pole of the power supply (e.g. a cathode). In certain such embodiments, the two additional electrodes function as anodes. In further embodiments, the polymer, prepolymer, oligomer or monomer is cationically functionalized. In still further embodiments, the polymer, prepolymer, oligomer or monomer is functionalized by an amine group. In certain embodiments, the amine is a tertiary amine In certain embodiments, the conductive component is made of aluminium.

In alternative embodiments, the EPD is an andic process. In certain such embodiments, the conductive component is connected to a positive pole of the power supply (e.g. an anode). In further embodiments, the two additional electrodes function as cathodes. In further embodiments, the polymer, prepolymer, oligomer or monomer is anionically functionalized. In certain embodiments, the conductive component is made of aluminium.

In some exemplary embodiments, the cathodic electrophoretic coating process is based on a water-insoluble film forming tertiary amine functionalised polymeric acrylic polyol blended stoichiometrically with a blocked polyisocyanate pre-polymer. The amine functionality can be neutralised with and organic acid to facilitate emulsification of the resin blend in water to form a coating bath. The application of direct current via electrodes immersed in the coating tank causes the resin blend to coat the conductive component connected to the negative pole, with the neutralising acid migrating to the anodes.

The liquid dispersion can further include additional materials, such as, polymerisation additives, catalysts, pigments, fillers/extenders, solvents, surfactants, functional materials, rheology agents or combinations thereof. The additional material may have electrophoretic potential of its own. In other embodiments, the additional material does not have an electrophoretic potential and relies entirely on the surrounding electrophoretic potential of the film-forming agent.

The liquid dispersion, according to the principles of the present invention, includes a rheology agent in addition to the film-forming material. Without wishing to being bound by theory or mechanism of action, rheological control of the coating during curing is essential for the formation of a second layer, having a substantially uniform thickness. Without further wishing to being bound by theory, it is assumed that the rheology agent assists in the formation of the second layer on the plurality of edges of the conductive component, particularly the second layer having a higher thickness on said edges than on the first and, optionally, second surface of the conductive component.

Various inorganic rheological agents as known in the art can be used in the liquid dispersion according to the principles of the present invention. The rheology agent can include a metal oxide, including, but not limited to, alumina ($Al_2O_3$), aluminate, silica ($SiO_2$), silicates, Mica, cerium oxide ($Ce_2O_3$), cerium dioxide ($CeO_2$), yttrium oxide ($Y_2O_3$), and combinations thereof. In some exemplary embodiments, the liquid dispersion includes alumina. In further embodiments, alumina is nanosized. In additional embodiments, the alumina is present in the liquid dispersion in a colloidal form.

In some embodiments, the liquid dispersion includes a functional material, such as, but not limited to boron nitride In some embodiments, the liquid dispersion includes a solvent. A non-limiting example of said solvent is Dowanol™PM. The liquid dispersion can further comprise an emulsion stabilizer. In some embodiments, said emulsion stabilizer is a cathodic emulsion stabilizer. A non-limiting example of a cathodic emulsion stabilizer is lactic acid. In some exemplary embodiments, the final cleaning solution comprises about 2-5% (w/w) Dowanol™ PM and about 0.1-1.0 (w/w) lactic acid in deionized water.

The EPD process can be performed at a temperature range of from about 16° C. to about 35° C. In further embodiments, the EPD process is performed at a temperature of from about 25° C. to about 30° C.

The EPD process can be performed at a voltage bias of from about 40V to about 120V and/or at a current density of from about 0.1 to about 0.2 A/dm$^2$. Each possibility represents a separate embodiment of the invention. In particular embodiments, the EPD process can be performed at a voltage bias of from about 40V to about 100V, from about 40V to about 80V, from about 60V to about 80V or from about 40V to about 60V. Each possibility represents a separate embodiment of the invention. In one embodiment, the EPD process is performed at a voltage bias of about 40V. In another embodiment, the EPD process is performed at a voltage bias of about 50V. In yet another embodiment, the EPD process is performed at a voltage bias of about 80V.

In some embodiments, duration of the EPD process is from about 30 sec to about 180 sec. In further embodiments, duration of the EPD process is from about 45 sec to about 120 sec.

In further embodiments, duration of the EPD process is from about 60 sec to about 120 sec. In certain embodiments, the EPD process is performed in a coating tank comprising an ultrafiltration system. Without wishing to being bound by theory or mechanism of action, the ultrafiltration system prevents or diminishes contamination of the coating tank and/or material waste.

In some embodiments, the liquid dispersion is essentially free of chloride ions (Cr). The term "essentially free", as used herein, refers to the concentration of chloride ions of less than about 50 ppm in the liquid dispersion.

In further embodiments, the step of forming the second layer by EPD includes curing of the electrodeposited polymer. The polymers suitable for the formation of the insulation coating according to the principles of the present invention include thermosetting polymers, self-crosslinkable polymers and radiation-curable polymers. The types of radiation can include, among others, UV radiation, visible light and electron beam.

In certain embodiments, upon the application of heat, the isocyanate blocking agent can be displaced by the hydroxyl functionality of the acrylic polyol, thereby facilitating the formation of a cross-linked polyurethane film.

In some embodiments, the curing includes initial drying of the coated conductive component at a temperature of from about 80° C. to about 90° C. for about 15 minutes. In further embodiments, the curing is performed following drying, at a temperature of from about 150° C. to about 170° C. In some embodiments, the curing is performed for at least about 30 minutes.

Additional information on the standard EPD techniques and coatings can be found in the 'Handbook of Electropainting Technology' by Willibald Machu, translated by Peter Neufeld, Publisher: Electrochemical Publications Ltd (December 1978) ISBN-10: 0901150061 ISBN-13: 978-0901150066.

Industrial processes utilizing some principles of EPD for applying paint from water-based preparations are well established in the metal finishing sector, and in particular automotive industry. However, various problems associated with the EPD process still exist, such as, for example, water electrolysis and surface energy phenomena of the substrate, which can create interferences and variability unless the substrate type and its preparation are compatible with the aqueous EPD chemistry and its deposition method. As EPD layers become thinner, factors such as substrate surface structure and wettability become more critical. The initial wetting of the substrate must be considered prior to applying voltage. Surface preparation techniques and the methods of introducing the substrate into the EPD dispersion all can have an impact on the final result. The surface preparation techniques are highly dependent on the substrate structure and composition. To the best of the inventors' knowledge, EPD coating have never been applied to the planar transformers, let alone to the conductive components thereof, generally characterized by low thickness and complex structure. Accordingly, specific substrate preparation processes have been developed by the inventors of the present invention, including the essential step of the formation of the first layer comprising an oxidized coating, as explained in detail hereinabove, and various pretreatment procedures, as described hereinbelow, in order to allow formation of the electrophoretically deposited insulating coating on the conductive components of planar transformers.

Pretreatment Step

In some embodiments, the method of the present invention comprises a pretreatment step. The pretreatment step can be performed in a tank, comprising a suitable solution, wherein the conductive component is exposed to said solution. In some embodiments, the treatment step comprises dipping of the conductive component into said solution. Typically, the pretreatment solution comprises an aqueous-based solution.

In some embodiments, the pretreatment is performed at a temperature of from about 16° C. to about 35° C. In further embodiments, the pretreatment is performed at a temperature of from about 25° C. to about 30° C.

In some embodiments, the pretreatment step comprises exposing the planar transformer conductive component to an alkaline electrolytic cleaning solution. In certain such embodiments, the conductive component is made of copper. In certain embodiments, the alkaline electrolytic cleaning solution comprises an alkaline salt selected from the group consisting of an alkali metal carbonate, alkali metal hydroxide, and combinations thereof. Each possibility represents a separate embodiment of the invention. In some embodiments, the alkaline electrolytic cleaning solution comprises potassium carbonate and potassium hydroxide.

In some embodiments, the alkaline electrolytic cleaning solution comprises from about 0.5% (w/w) to about 10% (w/w) potassium carbonate. In some embodiments, the alkaline electrolytic cleaning solution comprises from about 2.5% (w/w) to about 7.5% (w/w) potassium carbonate. In some embodiments, the alkaline electrolytic cleaning solution comprises from about 1.0% (w/w) to about 2.5% (w/w) potassium hydroxide. The alkaline electrolytic cleaning solution can further include disodium metasilicate. The weight percent of disodium meta-silicate in the alkaline electrolytic cleaning solution can range from about 2.5% to about 5%, In some embodiments, the step of exposing the planar transformer conductive component to the alkaline electrolytic cleaning solution comprises dipping of the conductive component into the electrolytic cleaning solution. In some embodiments, the conductive component is dipped in the electrolytic cleaning solution for about 1 to about 5 minutes. In further embodiments, the conductive component is dipped in the electrolytic cleaning solution for about 1 to about 3 minutes.

In some embodiments, the pretreatment step comprises exposing the planar transformer conductive component to an acidic cleaning solution. In certain such embodiments, the conductive component is made of aluminum. The acidic cleaning solution can include sulfuric acid, hydrofluoric acid, nitric acid or any combination thereof. Each possibility represents a separate embodiment of the invention. In some embodiments, the acidic cleaning solution comprises hydrogen peroxide. In some exemplary embodiments, the acidic cleaning solution comprises sulfuric acid, hydrofluoric acid, nitric acid and hydrogen peroxide. The total concentration of the acids can range from about 1% (w/w) to about 30% (w/w). In some embodiments, the total concentration of the acids ranges from about 3% (w/w) to about 30% (w/w). In further embodiments, the total concentration of the acids ranges from about 3% (w/w) to about 10% (w/w). In other embodiments, the total concentration of the acids ranges from about 15% (w/w) to about 25% (w/w). In additional embodiments, the total concentration of the acids ranges from about 1% (w/w) to about 15% (w/w). The temperature of the acidic cleaning solution can range from about 18☐ to about 30☐. In certain embodiments, the acidic cleaning solution has a room temperature.

In some embodiments, the step of exposing the planar transformer conductive component to the acidic cleaning solution comprises dipping of the conductive component into the acidic cleaning solution. In some embodiments, the conductive component is dipped in the acidic cleaning solution for about 1 to about 5 minutes. In further embodiments, the conductive component is dipped in the acidic cleaning solution for about 2 to about 4 minutes.

According to some embodiments, the pretreatment step further comprises exposing the planar transformer conductive component to an etching solution. In certain such embodiments, the conductive component is made of copper. In some embodiments, the etching solution comprises a sulfate-based salt. The sulfate-based salt can be selected from an alkali metal sulfate, alkali metal persulfate or a combination thereof. In some embodiments, the etching solution comprises sodium hydrogen sulfate and sodium persulfate. The weight percent of each one of sodium hydrogen sulfate and sodium persulfate in the electrolytic cleaning solution can range from about 1% to about 10%. In further embodiments, the weight percent of each one of sodium hydrogen sulfate and sodium persulfate ranges from about 3% to about 6%. Each possibility represents a separate embodiment of the invention.

In some embodiments, the step of exposing the planar transformer conductive component to an etching solution comprises dipping of the conductive component into the etching solution. In some embodiments, the conductive component is dipped in the etching solution for about 1 to about 3 minutes.

According to some embodiments, the pretreatment step comprises exposing the planar transformer conductive component to a degreasing solution. In certain embodiments, the degreasing solution comprises borate tetra sodium salt. The temperature of the degreasing solution can range from about 50☐ to about 100☐. In further embodiments, the temperature of the degreasing solution ranges from about 70☐ to about 90☐. In certain embodiments, the conductive component is made of aluminum.

In some embodiments, the step of exposing the planar transformer conductive component to the degreasing solution comprises dipping of the conductive component into the degreasing solution. In some embodiments, the conductive component is dipped in the electrolytic cleaning solution for about 5 to about 15 minutes. In further embodiments, the dipping time is from about 7 to about 10 minutes. In still further embodiments, the dipping time is from about 5 to about 8 minutes. In certain embodiments, degreasing is performed prior to the exposure of the conductive component to the acidic cleaning solution.

Additional Features of the Manufacturing Method

In some embodiments, the planar transformer conductive component is rinsed between each method step. In further embodiments, the planar transformer conductive component is rinsed between each solution tank. In some embodiments, the planar transformer conductive component is exposed to the EPD liquid dispersion without a prior drying step. In further embodiments, the conductive component is wetted by water before the exposure to the liquid dispersion. In further embodiments, said water is essentially free of chloride ions (Cr).

In some embodiments, the planar transformer conductive component further comprises at least two terminals, which are not exposed to the oxidizing solution, liquid dispersion, cleaning solution, etching solution, degreasing solution or any combination thereof. For example, the at least two terminals can be covered by a mask during the step of forming a first layer, step of forming a second layer, pretreatment step or any combination thereof. Each possibility represents a separate embodiment of the invention.

In some embodiments, the method comprises a final cleaning step comprising exposing the planar transformer conductive component to a solution comprising an organic solvent. The organic solvent can be selected from nonflammable hydrofluorocarbons; organochlorides, such as, but not limited to, 1,2-dichloroethylene; alcohols, such as, but not limited to, isopropanol and methanol; and combinations thereof. The non-limiting examples of said organic solvents include Vertrel® SFR, isopropyl alcohol (IPA), and Zestron® Co-150. In some embodiments, the solution is applied by dipping of the conductive component in said solution. The final cleaning step is required in order to remove any contaminants, including fluxes or the residual and undesired constituents of the various solutions and dispersions applied to the conductive component during the coating process. The insulated conductive component is typically cleaned from contaminants prior to the assembly thereof in the planar transformer. Without wishing to being bound by theory, it is contemplated that the second layer comprising the insulating EPD coating, which is adequately adhered to the conductive component should remain stable during and following the final cleaning step. It was found by the inventors of the present invention that the EPD coating applied to the conductive component without previously forming the first layer thereon, was not stable in the final cleaning step. Furthermore, the composition of the oxidizing solution, oxidized metal coating formation conditions and the thickness of the obtained coating had a prominent effect on the second layer stability in the final cleaning step.

As used herein and in the appended claims the singular forms "a", "an," and "the" include plural references unless the content clearly dictates otherwise. Thus, for example, reference to "a coil" includes a plurality of such coils and equivalents thereof known to those skilled in the art, and so forth. It should be noted that the term "and" or the term "or" is generally employed in its sense including "and/or" unless the content clearly dictates otherwise.

As used herein, the term "about", when referring to a measurable value such as an amount, a temporal duration, and the like, is meant to encompass variations of +/−10%, more preferably +/−5%, even more preferably +/−1%, and still more preferably +/−0.1% from the specified value, as such variations are appropriate to perform the disclosed methods.

The following examples are presented in order to more fully illustrate some embodiments of the invention. They should, in no way be construed, however, as limiting the broad scope of the invention. One skilled in the art can readily devise many variations and modifications of the principles disclosed herein without departing from the scope of the invention.

EXAMPLES

Example 1

Alternative Methods of Insulated Coating Formation (Comparative Example)

Prior to arriving at the method of the present invention, various alternative techniques were tested in order to obtain an insulating coating of the conductive component of a planar transformer, including spraying, dipping and brushing of a polymeric solution, emulsion or dispersion.

Spraying: It was found that spraying did not allow to control thickness distribution. Additionally, spraying introduced bubbles, which significantly decreased the quality of the insulating coating. Spraying was also found to be humid sensitivity. However, the major problem of the spraying technique was that the edges of the conductive component were not fully covered by the insulating coating.

Dipping: As in the case of spraying, dipping did not provide full coverage of the edges of the conductive component. Furthermore, it was found that the coating accumulated at the bottom of the coating tank. Additionally, the dipping process was time-consuming and produced only small batches. Life time of the dipping tank was limited, resulting in a waste of material.

Brushing: It was impossible to control the thickness in the brushing procedure, which led to excessively thin or thick coating on the edges of the conductive component. The overall brushing process was found to be inefficient.

Example 2

Exemplary Manufacturing Process of Copper-based EPD-coated Conductive Elements

Figure 5:
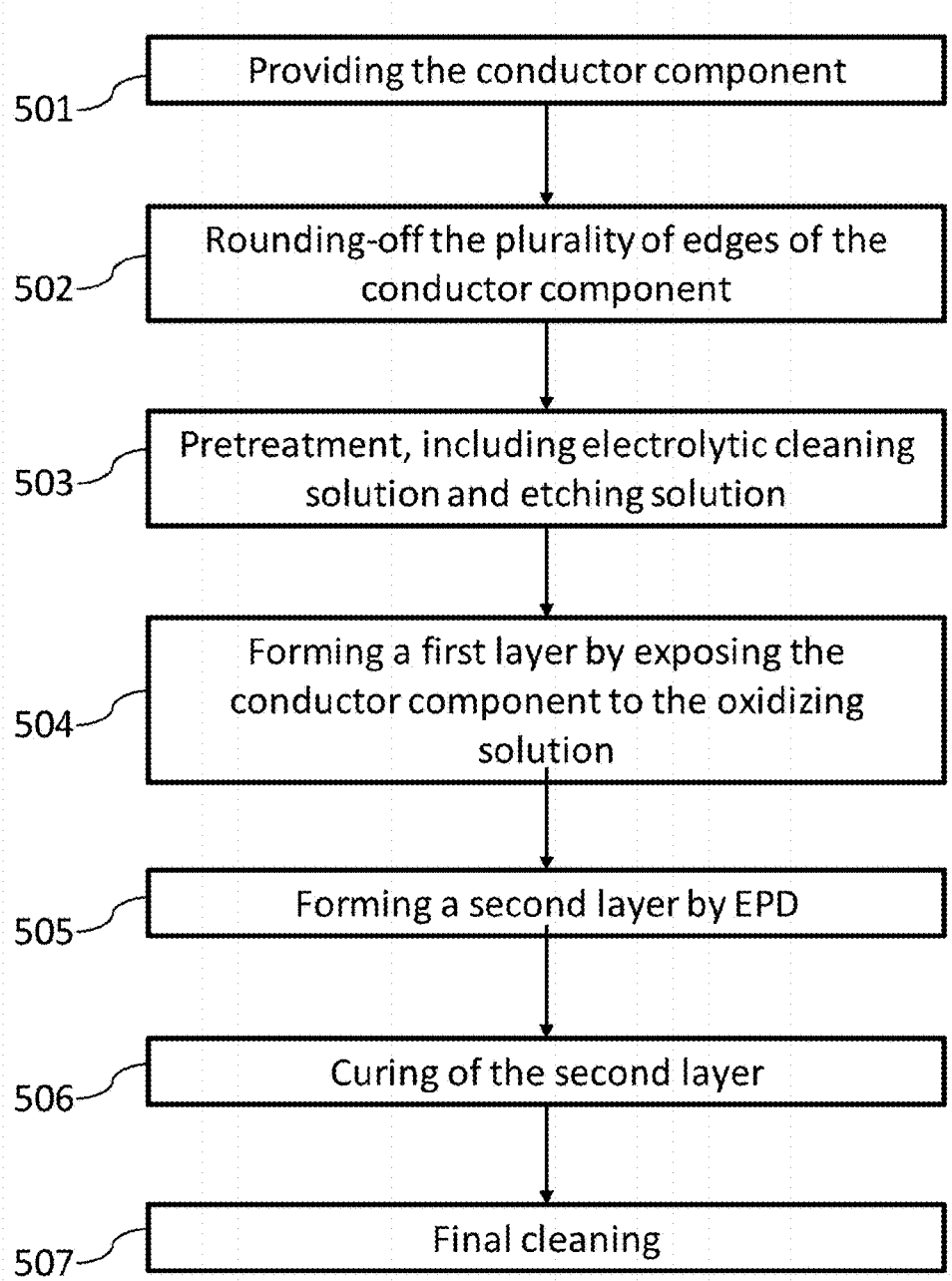
FIG. 5: Schematic illustration of a flow chart of an exemplary method of manufacturing of the electrically insulated component, according to some embodiments of the invention.

Reference is made to FIG. 5 which schematically illustrates a flow chart of an exemplary method of manufacturing of the electrically insulated component, according to some embodiments of the invention.

[STEP 501] Planar transformer conductive component was provided. The conductive component can be a flat lead frame coil or a flat coil projecting from a printed circuit panel. The conductive component was made of copper.

[STEP 502] When the conductive component is a lead frame coil, in particular, prepared by punching or cutting the edges of the lead frame coil were rounded off. In some embodiments, the edges are rounded off by a vibrator filled with different sizes and shapes of stones (depending on the lead frame shape) for a period of 10 minutes to 3 hours.

[STEP 503] The conductive component was dipped into the electrolytic cleaning solution for 1 to 5 minutes and rinsed with water. The electrolytic cleaning solution included 1.8% (w/w) potassium carbonate and 1.25% (w/w) potassium hydroxide and 4% (w/w) disodium metasilicate. The conductive component was then dipped into the etching solution for 3 minutes and rinsed with water. The etching solution included 5% (w/w) sodium hydrogen sulfate and 5% (w/w) sodium persulfate and dipped between 3 minutes.

[STEP 504] The conductive component was dipped into the oxidizing solution for 4 minutes and rinsed with water. The oxidizing solution included 25% (w/w) sodium chlorite, 20% (w/w) sodium hydroxide and 3% (w/w) trisodium phosphate.

[STEP 505] The conductive component was dipped into the liquid dispersion and connected to the power source. The EPD process was performed for 50-70 seconds at a voltage bias of 55-65 V. The liquid dispersion included tertiary amine functionalised polymeric acrylic polyol blended stoichiometrically with a blocked polyisocyanate pre-polymer and alumina as a rheology agent. The liquid dispersion used in the EPD process was Clearclad DV 864 from LVH Coatings LTD. The conductive component was then rinsed with water.

[STEP 506] The conductive component was dried at a temperature of 80° C. for 15 minutes and cured at a temperature of 150° C.-170° C. for at least 30 minutes.

[STEP 507] The conductive component was dipped into the final cleaning solution for up to 30 minutes, rinsed with water and dried. The final cleaning solution included Vertrel® SFR, isopropyl alcohol (IPA) and Zestron® Co-150.

Example 3

Effect of the Oxidized Metal Coating on the Insulating Coating

Many tests were carried out on clean bare copper conductive components. In spite of modifying all parameters of the EPD process, such as concentration, voltage, and curing time, no sufficient adhesion has been achieved. More than that, the EPD coating was peeled off easily when the conductive components were dipped in the final cleaning solution containing Vertrel® SFR, isopropyl alcohol (IPA) and Zestron® Co-150. In the conductive components, which did not have the oxidized metal coating beneath the insulating coating, attack of the organic solvent was clearly detected after about 5 minutes until total stripping on the insulating coating in less than 20 minutes.

Figure 6A:
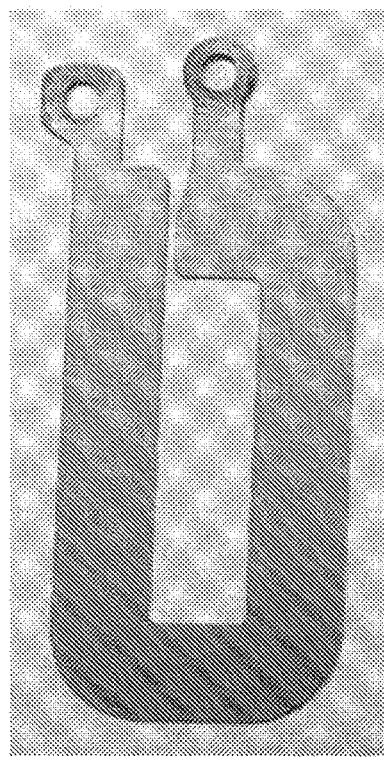
FIG. 6A: Photograph of a copper lead frame having an EPD coating applied to the bare copper surface (without the oxidized metal layer).
Figure 6B:
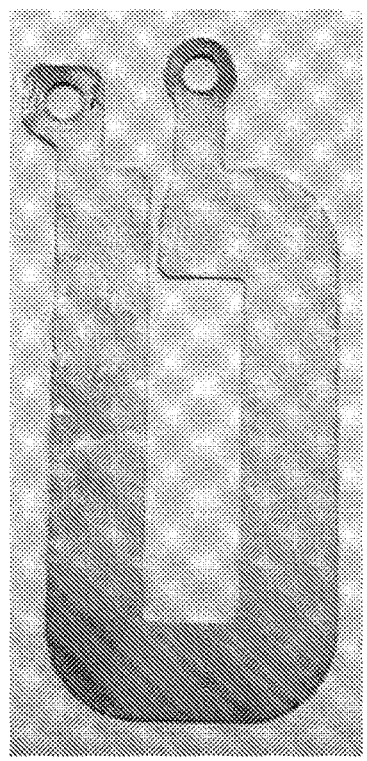
FIG. 6B: Photograph of the copper lead frame from FIG. 6A following dipping in the final cleaning solution.

FIG. 6A shows a photograph of a copper lead frame having an EPD coating applied to the bare copper surface (without the oxidized metal layer). The EPD coating is transparent. FIG. 6B shows the same lead frame following dipping in the final cleaning solution. It can be seen that the EPD coating peeled off from the copper lead frame. Said EPD-coated lead frame could not be used in a planar transformer.

Figure 7:
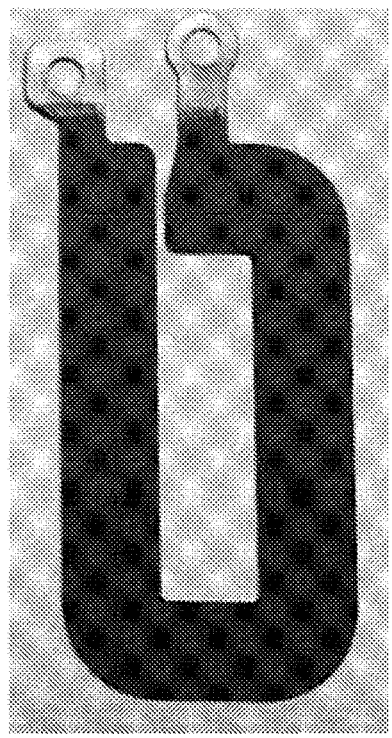
FIG. 7: Photograph of a copper lead frame having an EPD coating applied to the intermediate oxidized metal layer. The photograph was taken following dipping of the lead frame in the final cleaning solution.

The formation of the oxidized metal coating had a dramatic effect on the adhesion of the electrophoretically deposited coating. Conductive components including the oxidized metal coating and the insulating coating passed the adhesion tests (X-cut tape test). The conductive components including the oxidized metal coating were further exposed to the final cleaning solution for a period of up to 30 minutes. No effect has been seen on the insulating coating. FIG. 7 shows a photograph of a copper lead frame having an EPD coating applied to the intermediate oxidized metal layer. The EPD coating is transparent and the oxidized metal coating is black. The picture was taken following dipping of the lead frame in the final cleaning solution. No peeling of the EPD layer can be seen. The EPD coating of the lead frame remained intact following the final cleaning step, therefore being suitable for use in a planar transformer.

Example 4

Effect of the Oxidizing Solution Composition and Exposure Time on the Oxidized Metal Coating and the Insulating Coating Concentration of the oxidizing solution ingredients and dipping time affect the porosity and thickness of the coating. The thickness of the prepared oxidized metal coatings ranged from 0.5 µm to 5 µm. In order to reach a pre-set thickness, different compositions of the oxidizing solution and varying concentrations of sodium chlorite and sodium hydroxide, as well as different dipping times were tested. The effect of the coating thickness could be noted also from the color of the treated conductive components. The colors of the oxidized metal coatings of different thicknesses ranged from a very light brownish color to essentially black velvet form of the oxidized metal coating.

Results

Adhesion of the insulating coating to the conductive component was insufficient up to the 1.5 µm thickness of the oxidized metal layer. The insufficient adhesion was deduced from the observation of partial stripping of the insulating coating from the conductive component while exposing the coated conductive component to the final cleaning solution.

Oxidized metal coating having a thickness of 1.5-2.5 µm provided the best adhesion of the insulating coating to the conductive component and had the best appearance.

The conductive components having an oxidized metal coatings thicker than 2.5 µm were less stable in the high voltage tests than the conductive components with thinner coatings. Electrical breakdown of the EPD insulating coatings formed on the oxidized metal coatings having a thickness of higher than 2.5 µm occurred at a much lower voltage than of those formed on the 1.5-2.5 µm thick oxidized metal coatings. Without wishing to being bound by theory or mechanism of action, it is assumed that the inferior tolerance of thicker coatings to high voltages results from the rough structure of the cross section of the metal oxide layer.

In terms of the visual differences between the oxidized metal coatings of different thickness, all samples except the very light brown coatings passed the adhesion tests. However, only the darker ones and especially the black velvet coating were found to be stable in the final cleaning solution.

Example 5

Effect of the EPD Voltage on the Insulating Coating

Different voltages were applied during the electrophoretic deposition of the insulating coating in order to reach an optimal quality and thickness of the coating.

No sufficient thickness or build-up of coating has been achieved at a voltage level of less than 50V. The coating failed at high voltage testing.

Too quick build-up of coating at voltages higher than 50V failed in high voltage test, possibly due to enclosure of miniature pitting or bumbles. The best results were achieved at a voltage of about 50V. However, in order to compensate for voltage losses in large EPD bathes used on industrial scale, larger voltages than 50V may be required.

Example 6

Effect of the Edges Rounding Off Procedure on the Insulating Coating

Various techniques of edges rounding off were tested.
Electro polishing was tested in different solutions and different operating parameters of time, current and voltage. Results were not satisfactory, as it took a long time to reach an acceptable edge profile. Additionally, copper thickness was reduced and the polished surface did not assist the adhesion of the insulating coating. Furthermore, electro polishing is concerned with environmental issues of disposing of the contaminated rinsing water.

Sand blasting was tested with different materials. Despite the use of the different materials, satisfactory rounded edges could not be obtained. The surface was severely affected.

The best and most economical results were achieved by using an industrial vibrator, wherein various sizes and different mixtures of rubbing stones were tested to reach the optimal result.

Example 7

Manufacturing and Characterization of Aluminum-based EPD-coated Conductive Elements Aluminum lead frame was provided. The lead frame was dipped into the degreasing solution comprising borate tetra sodium salt for 7-10 minutes at a temperature of 70□-90□. The lead frame was then rinsed in water and dipped into the acidic cleaning solution for 2 to 4 minutes. The acidic cleaning solution included 3-8% (w/w) sulfuric acid, 1-3% (w/w) hydrofluoric acid, 1-3% (w/w) nitric acid and 1-4% (w/w) hydrogen peroxide, which was then diluted to 15-25% (w/w) of the total acid content.

The lead frame was then dipped into the conversion coating solution for 30 seconds to 3 minutes and rinsed with water. The conversion coating solution included, inter alia, potassium permanganate and hexafluorotitanic acid, diluted with water to up to 5% (w/w) concentration.

The lead frame was dipped into the liquid dispersion and connected to the power source. The EPD process was performed for 1-2 minutes at a voltage bias of 50 V or 80 V. The liquid dispersion included tertiary amine functionalised polymeric acrylic polyol blended stoichiometrically with a blocked polyisocyanate pre-polymer and alumina as a rheology agent. The liquid dispersion used in the EPD process was Clearclad DV 864 from LVH Coatings LTD. The lead frame was then rinsed with water. The lead frame was dried at a temperature of 80° C. for 15 minutes and cured at a temperature of 150° C.-170° C. for at least 30 minutes. Following curing, the lead frame was dipped into the final cleaning solution for up to 30 minutes, rinsed with water and dried. The final cleaning solution included Vertrel® SFR, isopropyl alcohol (IPA) and Zestron® Co-150.

Figure 8A:
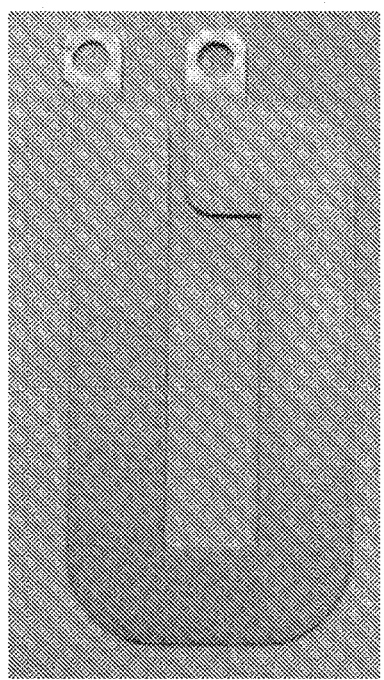
FIG. 8A: Photograph of an aluminum lead frame having an EPD coating applied to the intermediate oxidized metal layer at 80V.
Figure 8B:
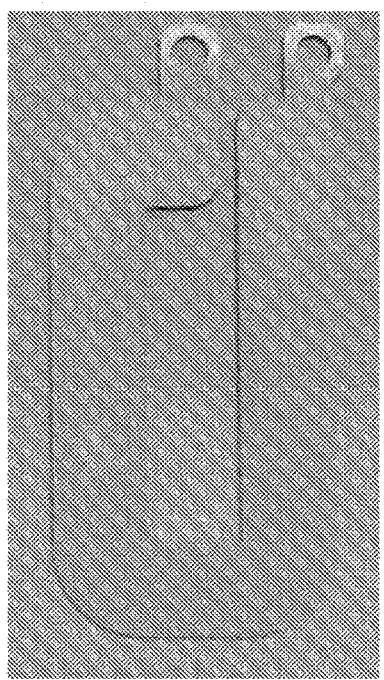
FIG. 8B: Photograph of an aluminum lead frame having an EPD coating applied to the intermediate oxidized metal layer at 50 V

EPD-coated aluminum lead frames including the intervening oxidized metal coating are showed in FIGS. 8A (EPD performed at 50V) and 8B (EPD performed at 80V). Electrical insulation of the EPD coated aluminum lead frames was evaluated. Said lead frames exceeded 500 Volts breakdown when tested against virgin copper. EPD-coated aluminum lead frames, which included the oxidized metal coating have passed successfully the adhesion tests. It is appreciated by persons skilled in the art that the present invention is not limited by what has been particularly shown and described hereinabove. Rather the scope of the present invention includes both combinations and sub-combinations of various features described hereinabove as well as variations and modifications. Therefore, the invention is not to be constructed as restricted to the particularly described embodiments, and the scope and concept of the invention will be more readily understood by references to the claims, which follow.

The invention claimed is:

1. An electrically insulated component configured for use in a planar transformer, the insulated component comprising:
    a planar transformer conductive component having two opposed surfaces comprising a first surface and a second surface and a plurality of edges; and
    two distinct coating layers comprising a first layer and a second layer, the first layer being disposed between the conductive component and the second layer, wherein the first layer and the second layer cover at least the first surface and the plurality of edges of the conductive component,
    wherein the first layer comprises an oxidized metal coating, which facilitates adhesion of the second layer to the conductive component, and the second layer comprises an electrophoretically deposited (EPD) insulating coating, comprising a polymer and an inorganic material and has a thickness in the range of about 10 µm to about 50 µm.

2. The electrically insulated component according to claim 1, wherein the thickness of the first layer ranges from about 0.1 µm to about 5 µm.

3. The electrically insulated component according to claim 1, wherein the conductive component is made of copper and wherein the oxidized metal coating is selected from the group consisting of cuprous oxide, cupric oxide, and a combination thereof.

4. The electrically insulated component according to claim 3, wherein the thickness of the first layer ranges from about 1 µm to about 5 µm.

5. The electrically insulated component according to claim 1, wherein the conductive component is made of aluminum.

6. The electrically insulated component according to claim 1, wherein the thickness of the second layer on the plurality of edges is higher than on the first surface by at least about 10%.

7. The electrically insulated component according to claim 1, wherein the polymer is selected from the group consisting of polyurethane, acrylic polymer, epoxy, polyester, aminoplast, polybutadiene, and combinations thereof.

8. The electrically insulated component according to claim 7, wherein the polymer is a polyurethane comprising units selected from the group consisting of acrylate units, methacrylate units, isocyanate units, and combinations thereof.

9. The electrically insulated component according to claim 1, wherein the inorganic material is selected from the group consisting of alumina ($Al_2O_3$), aluminate, silica ($SiO_2$), silicate, Mica, cerium oxide ($Ce_2O_3$), cerium dioxide ($CeO_2$), yttrium oxide ($Y_2O_3$), boron nitride, and combinations thereof.

10. The electrically insulated component according to claim 1, wherein the planar transformer conductive component is selected from a flat lead frame coil or a flat coil projecting from a printed circuit panel.

11. A planar transformer, comprising a plurality of insulated components according to claim 1, and a ferrite core, wherein the planar transformer conductive component is a flat lead frame coil and wherein the plurality of insulated components are stacked in a pillar, connected along the second layers of the adjacent insulated components; or wherein the plurality of the insulated components comprise a plurality of flat coils projecting from the printed circuit panel and wherein the plurality of insulated components are stacked in a pillar, connected along the second layer and the printed circuit panel of adjacent insulated components.

* * * * *